United States Patent
Yang et al.

(10) Patent No.: US 11,915,718 B2
(45) Date of Patent: Feb. 27, 2024

(54) POSITION DETECTION METHOD, APPARATUS, ELECTRONIC DEVICE AND COMPUTER READABLE STORAGE MEDIUM

(71) Applicant: SAMSUNG ELECTRONICS CO., LTD., Suwon-si (KR)

(72) Inventors: Lei Yang, Beijing (CN); Weiqin Wang, Beijing (CN); Lufen Tan, Beijing (CN); Lizhong Wang, Beijing (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 17/180,040

(22) Filed: Feb. 19, 2021

(65) Prior Publication Data

US 2021/0264940 A1 Aug. 26, 2021

(30) Foreign Application Priority Data

Feb. 20, 2020 (CN) .......................... 202010105491.1
Jul. 24, 2020 (CN) .......................... 202010725583.X

(51) Int. Cl.
*G10L 25/84* (2013.01)
*H04M 3/00* (2006.01)
(Continued)

(52) U.S. Cl.
CPC .............. *G10L 25/84* (2013.01); *G10L 25/30* (2013.01); *H04M 3/002* (2013.01); *H04S 7/303* (2013.01)

(58) Field of Classification Search
CPC ......... G10L 25/84; G10L 25/30; G10L 25/78; G10L 25/51; G10L 25/72; G10L 21/02; G10L 21/0208; G10L 21/0216; G10L 21/0232; G10L 21/32; G10L 21/028; G10L 19/0212; G10L 19/02; G10L 2021/02166; G10L 2021/0216; G10L 15/22;
(Continued)

(56) References Cited

U.S. PATENT DOCUMENTS 8,577,054 B2  11/2013  Hiroe
8,606,571 B1 * 12/2013  Every ................. G10L 21/0232
                                                                375/341
(Continued)

FOREIGN PATENT DOCUMENTS

JP    5971768 B2    8/2016
JP    6636633 B2    1/2020
(Continued)

OTHER PUBLICATIONS

International Search Report dated Jun. 7, 2021 issued by the International Searching Authority in counterpart International Application No. PCT/KR2021/001960 (PCT/ISA/210).
(Continued)

*Primary Examiner* — Leshui Zhang
(74) *Attorney, Agent, or Firm* — Sughrue Mion, PLLC

(57) ABSTRACT

A position detection method may include obtaining voice signals during a voice call by at least two voice collecting devices; obtaining position energy information of the voice signals; and identifying a position of the terminal device relative to a user during the voice call, from predefined positions based on the position energy information.

17 Claims, 33 Drawing Sheets

(51) Int. Cl.
*G10L 25/30* (2013.01)
*H04S 7/00* (2006.01)
*G01S 3/803* (2006.01)
*H04R 29/00* (2006.01)
*G10L 21/0208* (2013.01)

(58) Field of Classification Search
CPC ......... G10L 15/20; G10L 15/26; G10L 17/00; G01S 3/8036; G01S 3/803; G01S 5/186; G01S 5/18; H04M 3/002; H04M 3/00; H04M 3/18; H04M 3/2236; H04M 3/22; H04M 1/6008; H04M 1/60; H04M 1/72454; H04M 2207/18; H04M 1/72; H04M 1/724; H04M 1/72448; H04S 7/303; H04S 7/00; H04R 2499/11; H04R 29/005; H04R 29/00; H04R 3/005; H04R 25/405; G06F 3/167; G06F 21/32
USPC ....... 704/233, 232, 231, 234, 238, 239, 240, 704/243, 244, 245, 247, 250; 381/334, 381/388, 92, 94.2, 94.3, 94.9, 95, 98, 99, 381/100, 101, 102, 103, 110, 111, 112, 381/113, 114, 115, 119, 122, 66, 381/71.1–71.14, 56; 455/456.3, 569.1, 455/569.2, 575.3, 3.06, 420, 421
See application file for complete search history.

(56) References Cited

U.S. PATENT DOCUMENTS

| | | | |
|---|---|---|---|
| 8,660,581 B2 | 2/2014 | Davis et al. | |
| 9,064,398 B2 | 6/2015 | Davis et al. | |
| 9,282,282 B2 | 3/2016 | Jeong | |
| 9,396,731 B2 | 7/2016 | Herre et al. | |
| 9,412,387 B2 | 8/2016 | Davis et al. | |
| 9,413,862 B2 | 8/2016 | Tang et al. | |
| 9,947,339 B2 | 4/2018 | Son et al. | |
| 9,952,309 B2 | 4/2018 | Davis et al. | |
| 9,972,339 B1 | 5/2018 | Sundaram | |
| 10,109,282 B2 | 10/2018 | Del Galdo et al. | |
| 10,602,267 B2 | 3/2020 | Grosche et al. | |
| 2004/0220800 A1* | 11/2004 | Kong | H04R 1/406 704/205 |
| 2012/0214515 A1* | 8/2012 | Davis | H04W 4/024 455/456.6 |
| 2013/0259243 A1* | 10/2013 | Herre | G10L 19/02 381/57 |
| 2013/0268280 A1 | 10/2013 | Del Galdo et al. | |
| 2013/0272539 A1* | 10/2013 | Kim | G01S 3/8006 381/92 |
| 2014/0285338 A1 | 9/2014 | Davis et al. | |
| 2015/0380003 A1 | 12/2015 | Davis et al. | |
| 2016/0057522 A1* | 2/2016 | Choisel | H04R 1/08 381/92 |
| 2017/0131384 A1 | 5/2017 | Davis et al. | |
| 2018/0262832 A1 | 9/2018 | Grosche et al. | |

FOREIGN PATENT DOCUMENTS

| | | |
|---|---|---|
| KR | 101619578 B1 | 5/2016 |
| KR | 10-2019-0047885 A | 5/2019 |
| WO | 2019012135 A1 | 1/2019 |

OTHER PUBLICATIONS

International Written Opinion dated Jun. 7, 2021 issued by the International Searching Authority in counterpart International Application No. PCT/KR2021/001960 (PCT/ISA/237).
European Search Report, dated Oct. 18, 2022, issued by the European Patent Office, App No. 21756239.6.

* cited by examiner

POSITION DETECTION METHOD, APPARATUS, ELECTRONIC DEVICE AND COMPUTER READABLE STORAGE MEDIUM

CROSS-REFERENCE TO RELATED APPLICATION(S)

This application is based on and claims priority under 35 U.S.C. § 119 to Chinese Patent Application No. 202010105491.1, filed on Feb. 20, 2020, in the Chinese Patent Office, and Chinese Patent Application No. 202010725583.X filed on Jul. 24, 2020 in the Chinese Patent Office, the disclosures of which are incorporated by reference herein in their entireties.

BACKGROUND

1. Field

The disclosure relates to a field of computer technology and, more specifically, to a position detection method, apparatus, electronic device and computer readable storage medium.

2. Description of Related Art

With the development of the terminal device industry, users have higher and higher requirements for the call quality of terminal devices. Existing terminal devices generally have two or more microphones ("mics"). Due to the multi-microphone noise suppression method, the multi-microphone terminal device can obtain better call voice quality than the single-microphone terminal device. The effectiveness of the multi-microphone noise suppression method largely depends on the position of the user handholding the terminal device while the user uses the terminal device to make a voice call. However, different people, or the same person, have different positions for handholding a terminal device at different times. Therefore, detection of the position of the user handholding the terminal device while the user uses the terminal device to make a voice call plays a vital role in the noise suppression.

At present, some position detection methods, which are based on sensors (e.g., cameras, gyroscopes, gravity sensors, etc.), cannot obtain the position of the terminal device relative to the human face. Therefore, it is necessary to improve the existing position detection methods.

SUMMARY

Additional aspects will be set forth in part in the description which follows and, in part, will be apparent from the description, or may be learned by practice of the presented embodiments.

According to an aspect of an example embodiment, a position detection method may include obtaining voice signals during a voice call by at least two voice collecting devices of the terminal device; obtaining position energy information of the voice signals; and identifying a position of the terminal device relative to a user during the voice call, from predefined positions based on the position energy information.

The obtaining the position energy information of the voice signal may include obtaining projection energies of the voice signals corresponding to each of the predefined positions.

The obtaining the projection energies of the voice signals corresponding to each of the predefined positions may include obtaining the projection energy of each of a plurality of frequency bins corresponding to each of the predefined positions, wherein the plurality of frequency bins are included in the voice signals; obtaining weight of each of the frequency bins; and identifying the projection energies of the voice signals corresponding to each of the predefined positions, based on the projection energy of each of the plurality of frequency bins corresponding to each of the predefined positions and the weight of each of the frequency bins.

The obtaining the projection energy of each of the plurality of frequency bins corresponding to each of the predefined positions may include obtaining feature vectors corresponding to the voice signals, wherein the feature vectors include a respective feature value corresponding to each of the plurality of frequency bins; normalizing the feature vectors to obtain normalized feature vectors corresponding to the voice signals; and identifying the projection energy of each of the plurality of frequency bins corresponding to each of the predefined positions, based on the normalized feature vectors and feature matrixes corresponding to each of the predefined positions.

The obtaining the feature vectors corresponding to the voice signals may include obtaining at least two frequency domain signals corresponding to the voice signals; and combining the feature values of the frequency domain signals of the plurality of frequency bins to obtain the feature vectors of the voice signal.

Before normalizing the feature vectors, the method may include performing frequency response compensation on the feature vectors based on a predefined compensation parameter to obtain amplitude-corrected feature vectors.

The method may include, for a predefined position, identifying distances between a sample sound source and each of the voice collecting devices of the terminal device; identifying a feature vector corresponding to the predefined position, based on the distances between the sample sound source and each of the voice collecting devices; and identifying the feature matrixes corresponding to the predefined positions based on the feature vector corresponding to the predefined positions.

The obtaining weight of each of the frequency bins may include obtaining a predefined weight of each of the plurality of frequency bins.

The obtaining weight of each of the frequency bins may include identifying the weight of each of the plurality of frequency bins through a weight identification (or, determination) neural network, based on the projection energy of each of the plurality of frequency bins corresponding to each of the predefined positions or the position energy information of the voice signals.

The method may include identifying, by a control subnetwork, signal-to-noise ratio characteristic values of the voice signals based on the position energy information of the voice signals; identifying whether the weight of each of the plurality of frequency bins is a predefined weight based on the signal-to-noise ratio characteristic value; and based on the weight of each of the plurality of frequency bins not being the predefined weight, determining, by a calculation subnetwork, the weight of each of the frequency bins based on the projection energy of each of the plurality of frequency bins corresponding to each of the predefined positions.

The control subnetwork may extract features on the position energy information of the voice signals through a plurality of cascaded first feature extraction layers and obtain the signal-to-noise ratio characteristic value based on the extracted features through a classification layer of the control subnetwork; and the calculation subnetwork may extract features on the projection energy of each of the plurality of frequency bins corresponding to each of the predefined positions through a plurality of cascaded second feature extraction layers and obtain the weight of each of the plurality of frequency bins based on the extracted features through a linear regression layer of the calculation subnetwork.

The second feature extraction layer may concatenate the extracted features with features output by the corresponding first feature extraction layer in the control subnetwork, and output the concatenated features.

The identifying projection energies of the voice signals corresponding to each of the predefined positions, based on the projection energy of each of the plurality of frequency bins corresponding to each of the predefined positions and the weight of each of the plurality of frequency bins, may include, weighting the projection energy of each of the plurality of frequency bins corresponding to each of the predefined positions based on the weight of each of the plurality of frequency bins; and summating the weighted projection energy of each of the plurality of frequency bins corresponding to each of the predefined positions to obtain the projection energies of the voice signals corresponding to the predefined positions.

The identifying the position of a terminal device relative to the user during the voice call from the predefined positions based on the position energy information may include selecting a position corresponding to maximum position energy information to obtain the position of the terminal device relative to the user during the voice call.

The method may include performing noise suppression on the voice signal to obtain a noise-suppressed voice signal, based on the position of the terminal device relative to the user during the voice call.

According to an aspect of an example embodiment, a position detection apparatus may include at least one processor configured to obtain voice signals during a voice call from at least two voice collecting devices of the position detection apparatus; obtain position energy information corresponding to the voice signals; and identify a position of the position detection apparatus relative to a user during the voice call, from predefined positions based on the position energy information.

According to an aspect of an example embodiment, a terminal device may include one or more processors and a memory configured to store one or more application programs that, when executed by the one or more processors, cause the one or more processors to obtain voice signals during a voice call from at least two voice collecting devices of the terminal device; obtain position energy information of the voice signals; and identify a position of the terminal device relative to a user during the voice call, from predefined positions based on the position energy information.

According to an aspect of an example embodiment, a non-transitory computer-readable medium may store instructions that, when executed by a processor of terminal device, cause the processor to obtain voice signals during a voice call from at least two voice collecting devices of the terminal device; obtain position energy information of the voice signals; and identify a position of the terminal device relative to the user during the voice call, from predefined positions based on the position energy information.

The technical solution according to the example embodiments of the present disclosure has at least the following beneficial effects: identifying a position of a terminal device relative to a user during the voice call from a plurality of predefined positions by presetting a plurality of predefined positions and then according to the position energy information of the voice signals obtained by a plurality of voice collecting devices of the terminal device during the voice call. That is, it can provide a reference for enhancing the voice call quality and optimize the effect of noise suppression by obtaining position detection result.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
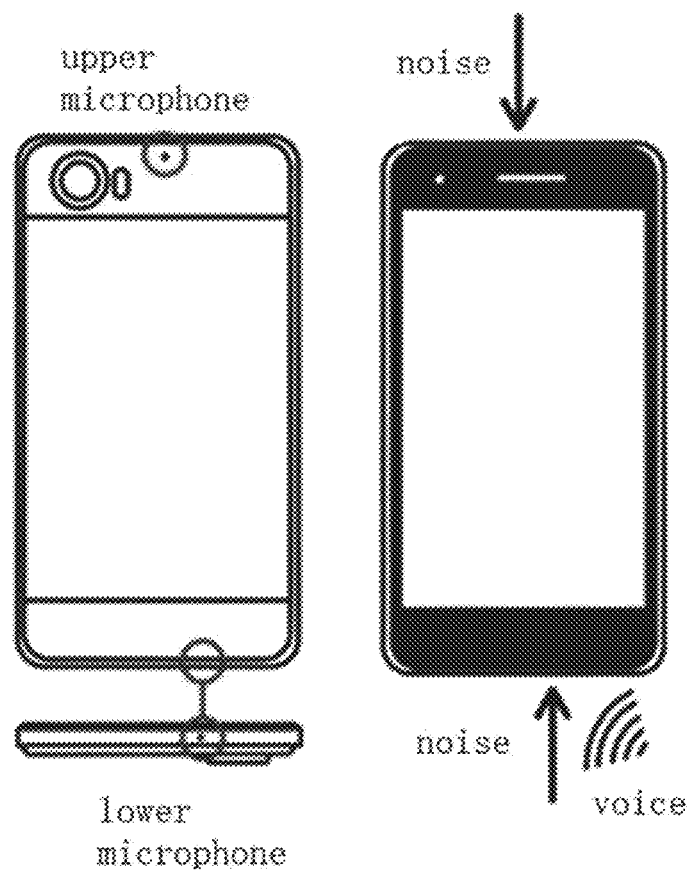
FIG. 1 is a schematic diagram of a terminal device including two microphones according to an example embodiment of the present disclosure.

The example embodiments of the present disclosure are described in detail below, and are illustrated in the drawings, where throughout the drawings, the same or similar reference numbers are used to depict the same or similar elements or elements having the same or similar functions. The example embodiments described below with reference to the accompanying drawings are illustrative, and are only used to explain the present disclosure, rather than being construed as limiting the present disclosure.

Those skilled in the art should understand that the singular forms "a," "an," "said," and "the" include plural referents unless the context clearly dictates otherwise. It should be further understood that the expression "comprising," or "comprises," used in the specification of the present disclosure means the existence of the features, integers, steps, operations, elements and/or components, but does not preclude the existence or addition of one or more other features, integers, steps, operations, elements, components and/or combinations thereof. It should be understood when an element is referred to as being "connected to" or "coupled to" another element, the element may be directly connected or coupled to the other element, or an intervening element may be present. Furthermore, the terms "connected" or "coupled" used herein may include a wireless connection or a wireless coupling. The phrase "and/or" used herein includes all or any one and all combinations of one or more of the associated listed items.

To make the objectives, technical solutions, and advantages of the present disclosure clearer, the following describes the embodiments of the present disclosure in further detail with reference to the accompanying drawings.

Terminal device (e.g., mobile phones, tablets, smart watches, etc.) manufacturers may set up two or more microphones on the terminal device to obtain better call voice quality. Specifically, a plurality of voice signals during the voice call are obtained through a plurality of microphones respectively, and noise suppression processing is performed on the plurality of voice signals to obtain voice signals with higher signal-to-noise ratio (SNR). The above process of noise suppression processing on the voice signal during a voice call can be called a call voice enhancement.

Taking a dual-microphone terminal device as an example, as shown in FIG. 1, two microphones are located at the upper end and lower end of the terminal device. When the user talks in the handhold mode, it can be considered that the voice signal obtained by the lower microphone contains the user's voice and noise, while the voice signal obtained by the upper microphone only contains noise. Accordingly, the voice signal obtained by the upper microphone is used as for reference, to eliminate the noise in the voice signal obtained by the lower microphone to get a clean voice.

Figure 2A:
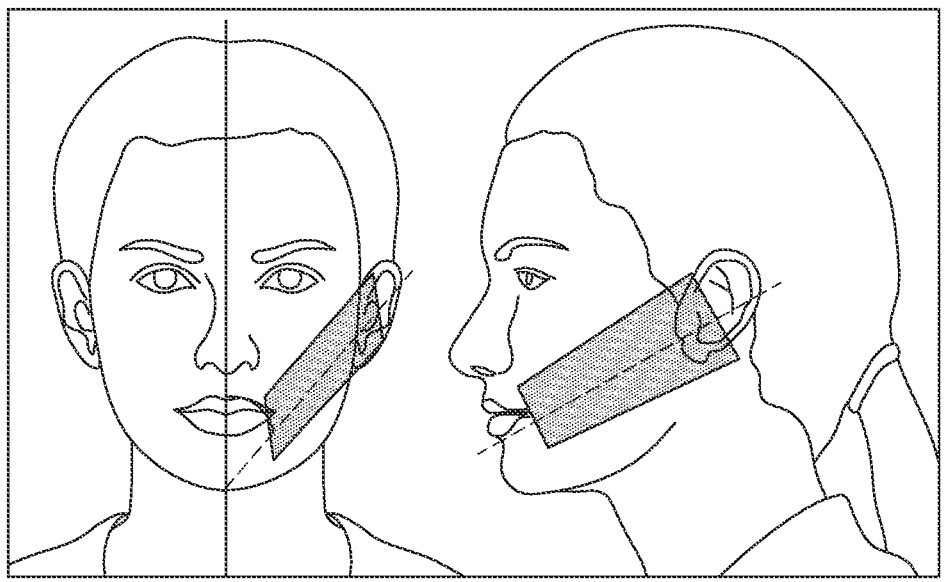
FIG. 2A is a schematic diagram of a user's position in a normal handhold mode according to an example embodiment of the present disclosure.
Figure 2B:
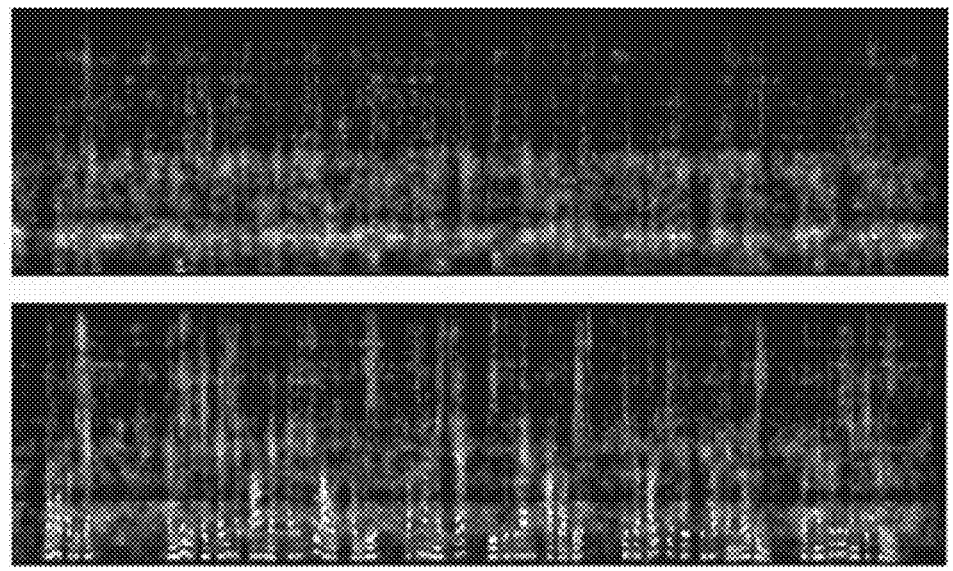
FIG. 2B is a waveform diagram of a voice signal obtained by a microphone in a normal handhold mode according to an example embodiment of the present disclosure.

In a general handhold (or handset) mode, the user's positions (the position of the handholding device) and the voice signals obtained by the upper and lower microphones are shown in FIGS. 2A and 2B, respectively. At this time, the lower microphone of the terminal device is close to the user's mouth, while the upper microphone is far away from the user's mouth. Compared with the voice signal obtained by the upper microphone, the voice signal obtained by the lower microphone contains more user's voice components, and the upper microphone signal is mostly composed of noise. Thus, the voice signal obtained by the upper microphone is used as the noise signal reference to eliminate the noise in the voice signal obtained by the lower microphone, and to obtain a clean voice finally. This method can give full play to the advantages of a plurality of microphones and obtain a good noise suppression effect. At the same time, the introduced voice distortion is very small. This noise suppression processing method can be called "multi-microphone noise suppression method."

Figure 3A:
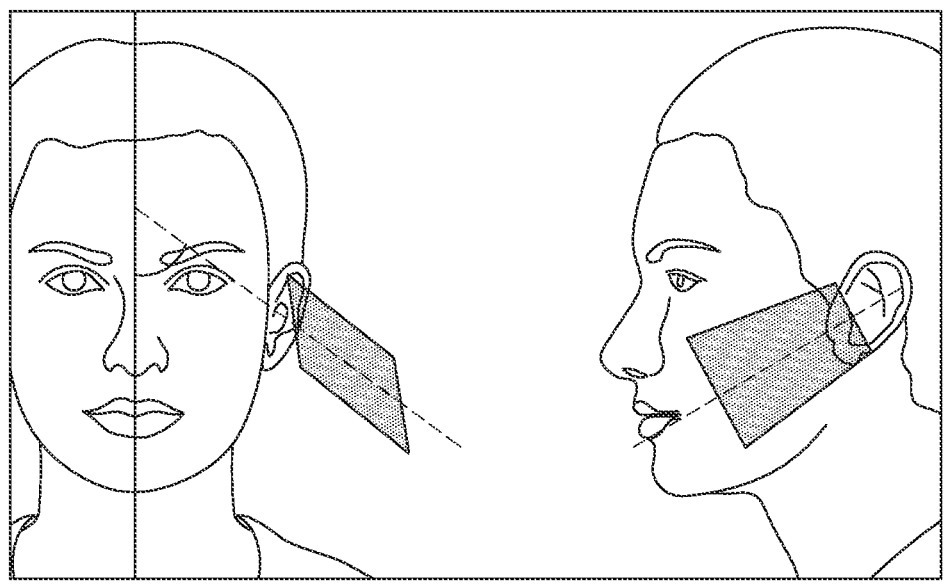
FIG. 3A is a schematic diagram of a user's position in an abnormal handhold mode according to an example embodiment of the present disclosure.
Figure 3B:
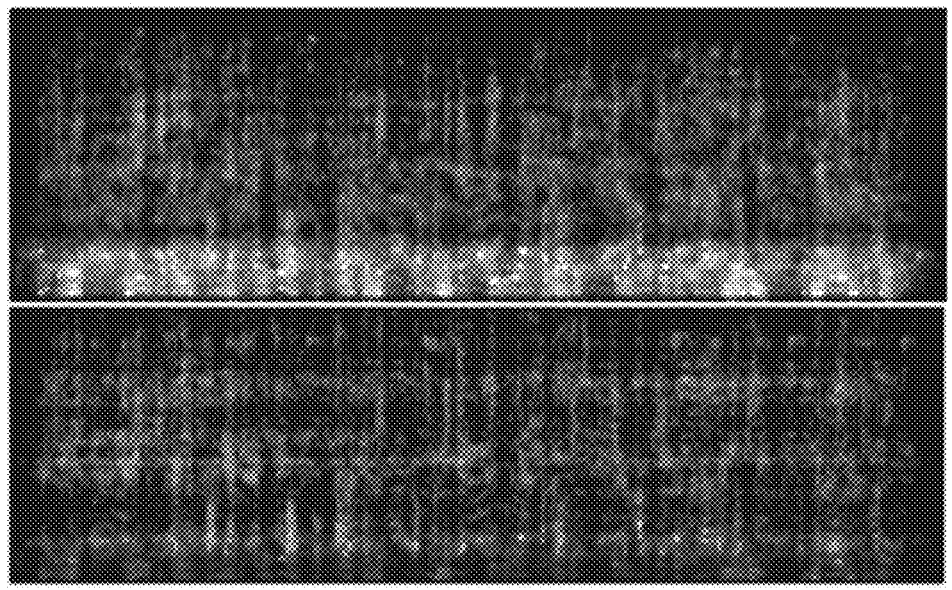
FIG. 3B is a waveform diagram of a voice signal obtained by a microphone in an abnormal handhold mode according to an example embodiment of the present disclosure.

However, in some abnormal handhold modes, for example, when the user makes a call in the abnormal position shown in FIG. 3A, the voice signals obtained by the upper and lower microphones are shown in FIG. 3B. At this time, the lower microphone of the terminal device is far away from the user's mouth, and has no advantage in distance compared with the upper microphone. The voice signals obtained by the upper and lower microphones contain basically the same voice components. If the voice signal obtained by the upper microphone is used as the noise signal reference to eliminate the noise in the voice signal obtained by the lower microphone, the voice signal may be seriously damaged. Therefore, before noise suppression processing, the terminal device's position relative to the user should be detected. When it is detected that the user uses an abnormal position to make a voice call, the voice signal obtained by the upper microphone is no longer used as the noise signal reference, and only the voice signal obtained by the lower microphone is subjected to single-channel noise suppression. This noise suppression processing method can be called "single microphone noise suppression method."

It can be seen from the above that in the normal position as shown in FIG. 2A, the voice enhancement processing can be performed by means of the multi-microphone noise suppression method, and in the abnormal position as shown in FIG. 3A, the voice enhancement processing can be performed by means of the single microphone noise suppression method. Thus, it is advisable to identify a current position of the terminal device relative to the user before performing voice enhancement processing on the voice signal.

There is currently no effective method for detecting the terminal device's position relative to the user in the handhold mode during a voice call. In the existing call voice enhancement solutions, there is no independent module to detect the position of terminal device relative to the user during the voice call. Usually, the parameters in the noise suppression module are adjusted so that the performance suppression of the noise suppression module is within an acceptable range in an abnormal position. At the same time, although some position detection methods, which are based on the built-in sensors (e.g., camera, gyroscope, gravity sensor, etc.) of the terminal device, can obtain the absolute position of the terminal device relative to the horizontal plane, the methods cannot obtain the position of the terminal device relative to the user (that is, user' human face). Therefore, it is not suitable for the position detection for handheld terminal devices during a voice call, that is, it is not suitable for detecting the terminal device's position relative to the user before noise suppression processing.

At present, voice enhancement methods (used to detect the current position of the a mobile phone relative to the user) mainly include two types, the one of which is the method based on the comparison of signal spectrum components for position detection, and the other of which is the method based on cross spectrum energy (CSP) for position detection.

Specifically, the method based on the comparison of signal spectrum components focuses on whether the information obtained from the two signals has sufficient "discrimination." That is, whether the two signals have sufficient discrimination is identified by determining the energy, spectrum similarity, or the voice existence probability calculated independently based on each microphone signal, based on the information obtained from the two signals, so as to identify the current position of the mobile phone relative to the speaker.

Further, the CSP-based method is used to extract the phase difference of the two signals in the spectrum domain, convert the phase difference to the time domain, and obtain the relative delay of the main component of the signal, and identify the mobile phones position relative to the speaker based on the this delay.

However, the method based on the comparison of spectrum components is obviously not suitable for signals with low SNR, that is, it will fail when there is high environmental noise. Furthermore, when the environmental noise is human voice noise or other non-stationary noise, the voice existence probability calculated independently based on each microphone signal will no longer be accurate, which will cause the failure of the detection algorithm. The failure of the detection algorithm will make it impossible to identify the mobile's position relative to the speaker. The CSP-based method has a certain tolerance for signals with low SNR and also has robustness for non-stationary noise (but it will still fail in the case of low SNR and non-stationary noise). Due to the inherent limitations of the algorithm, it can only support two signals to participate in the calculation, and cannot maximize the ability of a mobile phone having two or more microphones. In addition, the CSP algorithm requires the entire spectrum of the two signals for calculation (that is, if the signal is 8000 hz, then the signals of 0~8000 hz are required to participate in the calculation), and includes a large number of division operations and additional inverse Fast Fourier Transform (FFT) operations, leading to relatively high complexity and a heavy burden on the hardware, as shown in Table 1.

TABLE 1

|  | Robustness for non-stationary noise | Robustness for signal with low SNR | Support of any number of microphones | Low algorithm complexity |
| --- | --- | --- | --- | --- |
| Spectrum component comparison method | Low | Low | Yes | normal |
| CSP | normal | High | No | No |

The position detection method, apparatus, electronic device, and computer-readable storage medium according to the example embodiments of the present application aim to solve the above technical problems.

The position detection method according to the example embodiments of the present application has strong robustness to non-stationary and low SNR noise, and the example embodiments of the present disclosure can support any device with more than two microphones, where the number of microphones corresponds to dimensions of the feature vector. That is, when a new microphone is added to the device, one dimension is added to the feature vector in the embodiment of the present disclosure, and the basic structure of the method does not need to be changed. At the same time, the complexity of the algorithm is greatly reduced due to the introduction of a predefined position. At the same time, in an example embodiment of the present disclosure, a weight identification neural network is used to select and utilize the frequency spectrum of the microphone signal (the weight identification neural network is used to weight different frequency bins, and the frequency bin with high SNR is assigned a higher weight, and the frequency bin with low SNR is assigned a lower weight), and hence the robustness and the accuracy of position detection are further enhanced, as shown in Table 2.

TABLE 2

|  | Robustness for non-stationary noise | Robustness for signal with low SNR | Support of any number of microphones | Low algorithm complexity |
| --- | --- | --- | --- | --- |
| Spectrum component comparison method | Low | Low | Yes | normal |
| CSP | normal | High | No | No |
| Voice enhancement processing method in the present disclosure | High | High | Yes | Yes |

The technical solutions of the present disclosure and how the technical solutions of the present disclosure solve the above technical problems are described in detail below with example embodiments. The following example embodiments can be combined with each other, and the description of same or similar concepts or processes may not be repeated in some embodiments. The embodiments of the present disclosure will be described below in conjunction with the drawings.

Figure 4:
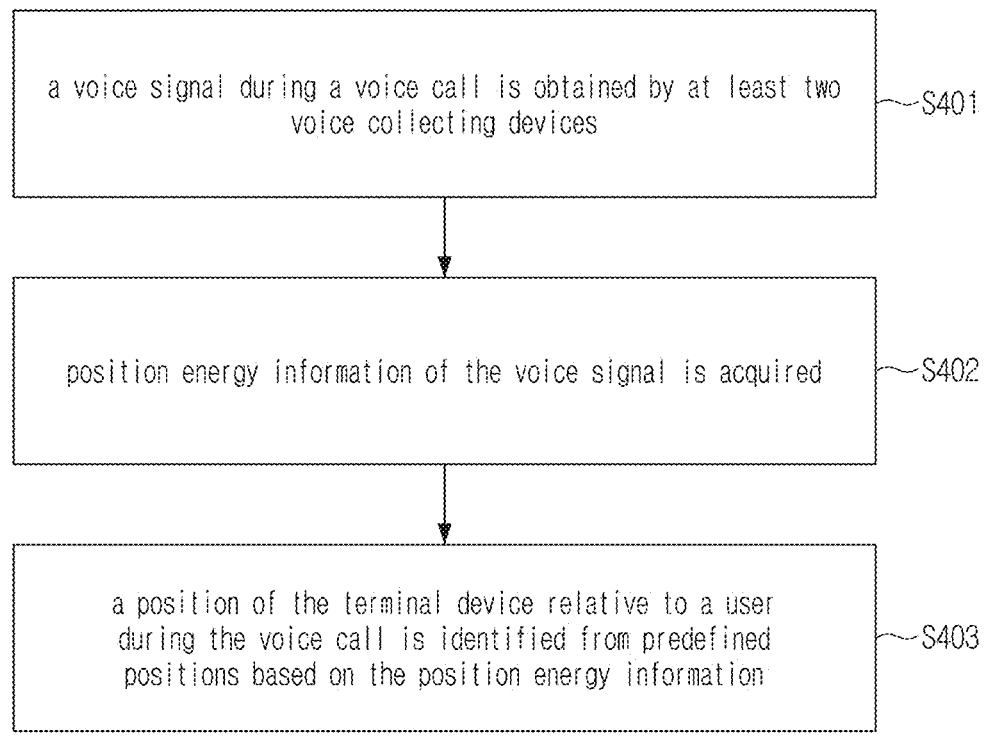
FIG. 4 is a schematic flowchart of a position detection method according to an example embodiment of the present disclosure.

FIG. 4 is a schematic flowchart of a position detection method in an embodiment of the present disclosure. As shown in FIG. 4, the position detection method includes the following steps.

At operation S401, voice signals during a voice call are obtained by at least two voice collecting devices.

Each voice signal may include the voice of the user (that is, the speaker) during the voice call, and may also include noise during the voice call.

At operation S402, position energy information of the voice signals is obtained.

Where the obtaining of position energy information of the voice signal specifically is the obtaining of projection energies of each voice signals corresponding to each of the predefined positions.

At operation S403, a position of the terminal device relative to a user during the voice call is identified from predefined positions based on the position energy information.

The terminal device's position relative to the user can be understood as the position relationship between the user terminal device used by the user and the user's face.

Specifically, in the embodiment of the present disclosure, when the user makes a voice call through the terminal device, the voice signals during the user's voice call are obtained every preset time, and the position detection is performed on the voice signals input by the user. For example, when the user makes a voice call through the terminal device, the user's voice signals are obtained every 20 seconds, and the position detection is performed on the user's voice signals.

Alternatively, in the example embodiment of the present disclosure, when the user makes a voice call through the terminal device, and when the user-triggered position detection instruction is detected, the voice signals by the user is obtained, and the position detection is performed on the voice signals input by the user. For example, when the user makes a voice call through the terminal device, the user can trigger the terminal device to display a position detection instruction so as to trigger the position detection for the voice signal input by the user.

Further, in the example embodiment of the present disclosure, the above two methods of triggering position detection can be used in combination. That is, when the position detection instruction triggered by the user is detected during user makes a voice call through the terminal device, the user's voice signals are obtained every preset time, and the position detection is performed on the user's voice signals. In the example embodiment of the present disclosure, any manner of triggering the acquisition of the user's voice signals and performing position detection based on the user's voice signals are within the protection scope of the example embodiments of the present disclosure.

Specifically, a plurality of predefined positions can be preset, and the feature vectors corresponding to predefined positions can be obtained. The feature vector corresponding to the user position (the feature vector of the voice signal) is obtained, and the feature vector corresponding to the user position may be compared with the feature vectors corresponding to predefined positions. And the position whose feature vector is closest to the feature vector corresponding to the user position among predefined positions is identified as the terminal's position relative to the user, that is, the position detection result is obtained. In the embodiment of the present disclosure, the normalized feature vector may be used. The feature vector corresponding to the user position is "closest" to the feature vector corresponding to a certain predefined position, that is, the feature vector corresponding to the user position has a maximum projection energy on the feature vector corresponding to the predefined position.

The solution of the embodiment of the present disclosure may identify a position of the terminal device relative to the user during the voice call from a plurality of predefined positions by presetting a plurality of predefined positions and then according to the position energy information of the voice signals obtained by at least two voice collecting devices during the voice call. That is, it can provide a reference for enhancing the voice call quality and optimize the effect of noise suppression by obtaining a terminal device's position relative to the user detection result.

Figure 5A:
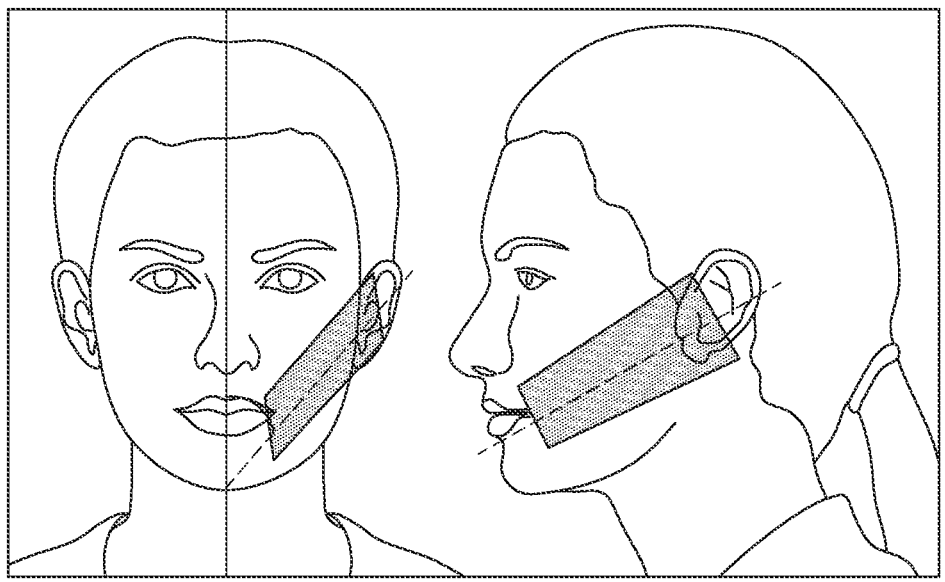
FIG. 5A is a schematic diagram of a predefined position 1 according to an example embodiment of the present disclosure.
Figure 5B:
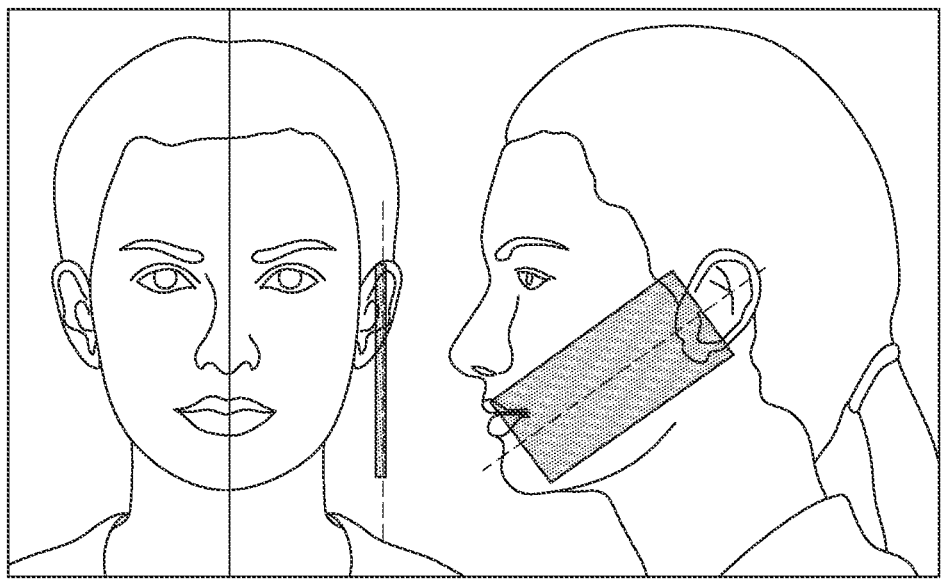
FIG. 5B is a schematic diagram of a predefined position 2 according to an example embodiment of the present disclosure.
Figure 5C:
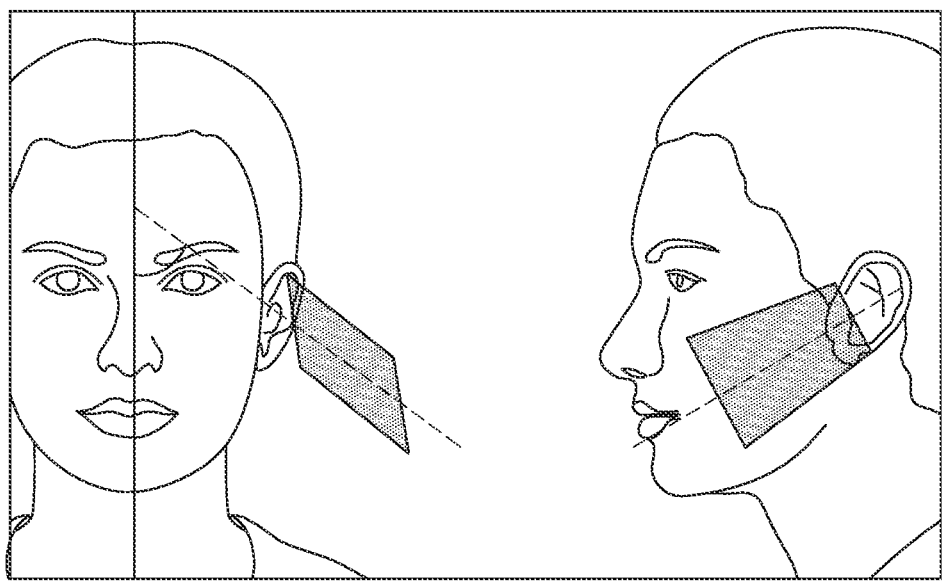
FIG. 5C is a schematic diagram of a predefined position 3 according to an example embodiment of the present disclosure.
Figure 5D:
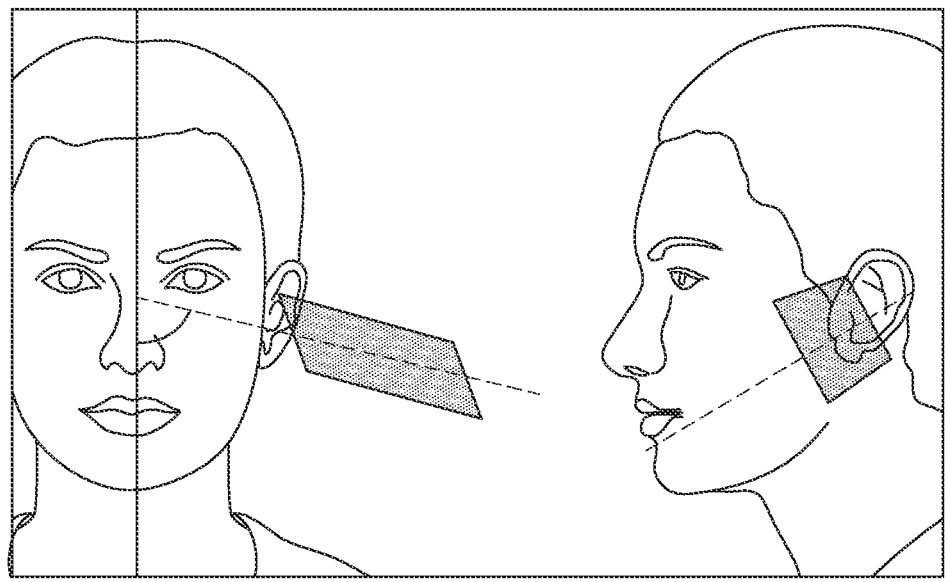
FIG. 5D is a schematic diagram of a predefined position 4 according to an example embodiment of the present disclosure.
Figure 5E:
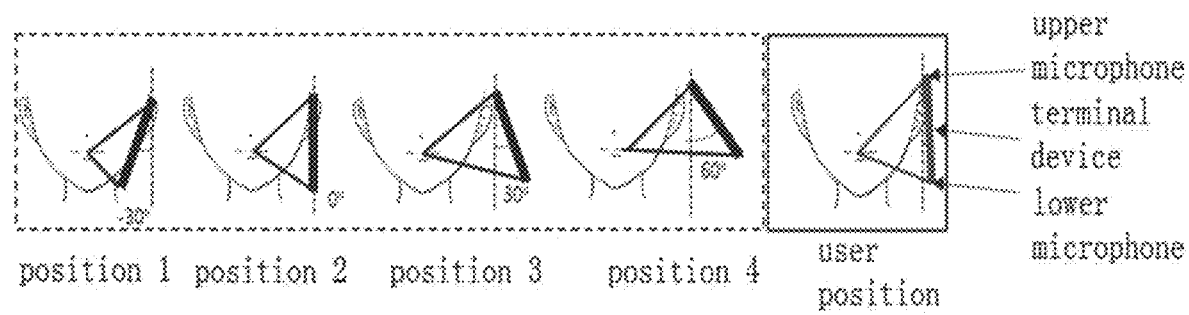
FIG. 5E is a schematic diagram of the distances between the sound source and the microphone in predefined positions and the user position respectively according to an example embodiment of the present disclosure.
Figure 5F:
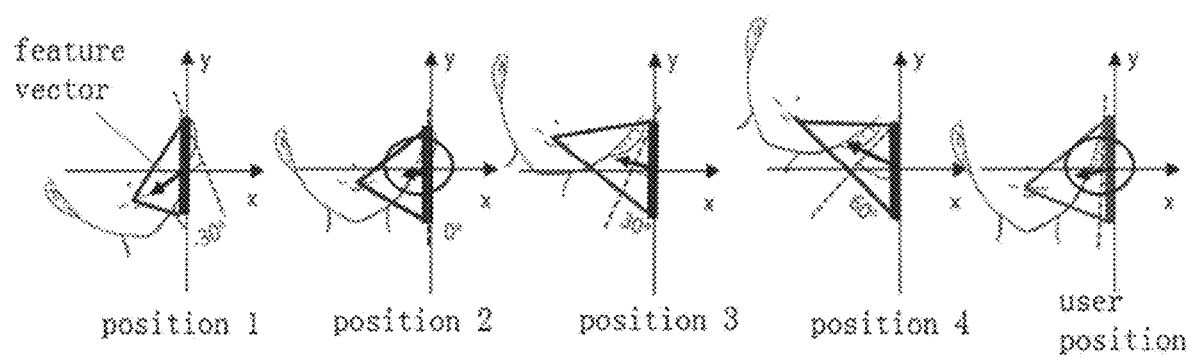
FIG. 5F is a schematic diagram of feature vectors corresponding to predefined positions and the user position respectively according to an example embodiment of the present disclosure.
Figure 5G:
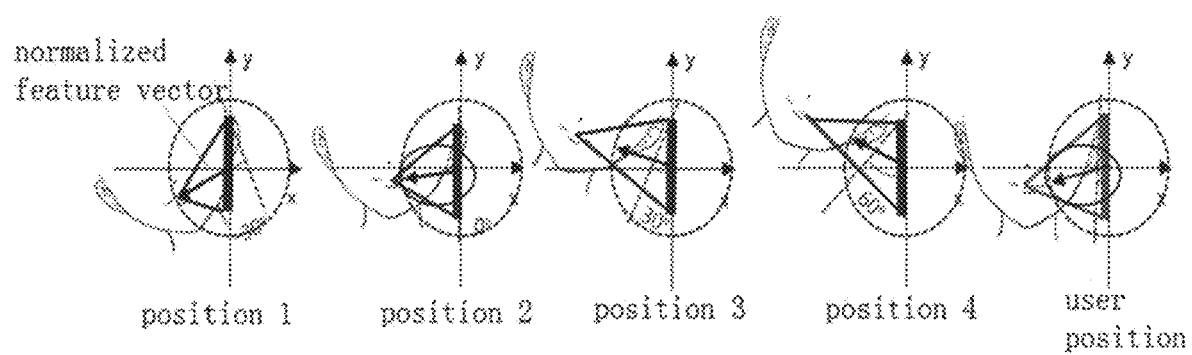
FIG. 5G is a schematic diagram of the normalized feature vectors corresponding to predefined positions and the user position respectively according to an example embodiment of the present disclosure.

For example, it is assumed that four predefined positions are preset, namely position 1, position 2, position 3, and position 4, as shown in FIGS. 5A-5D. The angle between the central axis of the call device (such as terminal device) and the central axis of the user's face in position 1 is −30°, the angle between the central axis of the call device and the central axis of the user's face in position 2 is 0°, the angle between the central axis of the call device and the central axis of the user's face in position 3 is 30°, and the angle between the central axis of the call device and the central axis of the user's face in position 4 is 60°. The call device's position relative to the user may be identified by the relative position of the sound source (user's mouth) and the microphones of the terminal device. In a terminal device including two voice collecting devices (an upper microphone and a lower microphone respectively), the call device's position relative to the user can be identified according to the distance from a sound source to the upper microphone and the distance from the sound source to the lower microphone. In predefined positions and a user position, the distances from the sound source to the upper and lower microphones are shown in FIG. 5E. Then, a rectangular coordinate system is constructed by using the longitudinal central axis of the terminal device as the Y axis and the horizontal central axis of the terminal device as the X axis. The feature vector corresponding to each position is identified in the rectangular coordinate system, where the starting point of the feature vector is the origin of the rectangular coordinate, the direction of the feature vector points to the sound source, and the length of the feature vector indicates the magnitude of the corresponding voice energy. The feature vectors corresponding to predefined positions and the user position are shown in FIG. 5F. It can be seen in FIG. 5F that the feature vector corresponding to the user position is closest to the feature vector corresponding to position 2. As shown in FIG. 5G, in order to further eliminate the influence of voice energy, the feature vectors in FIG. 5F are normalized at a unit circle through normalization. It can also be seen in FIG. 5G that the feature vector corresponding to the user position is closest to the feature vector corresponding to position 2.

Figure 6A:
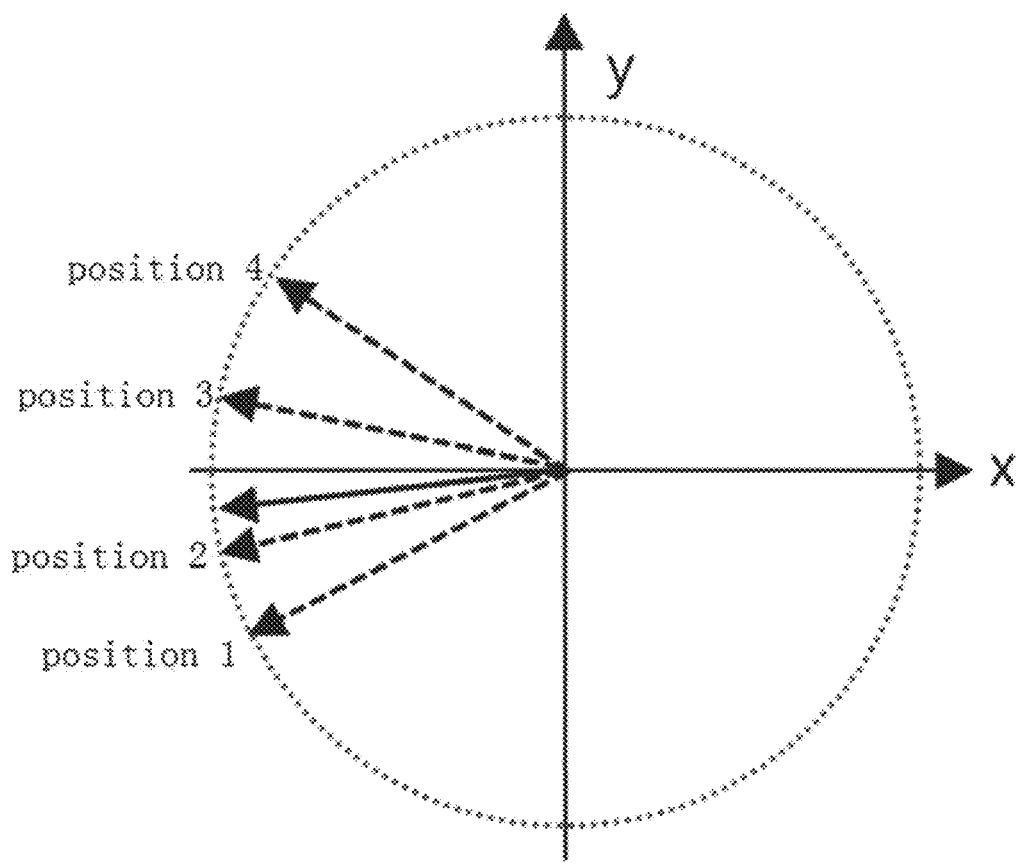
FIG. 6A is a schematic diagram of the normalized feature vectors corresponding to the user position and predefined positions in the same coordinate system according to an example embodiment of the present disclosure.
Figure 6B:
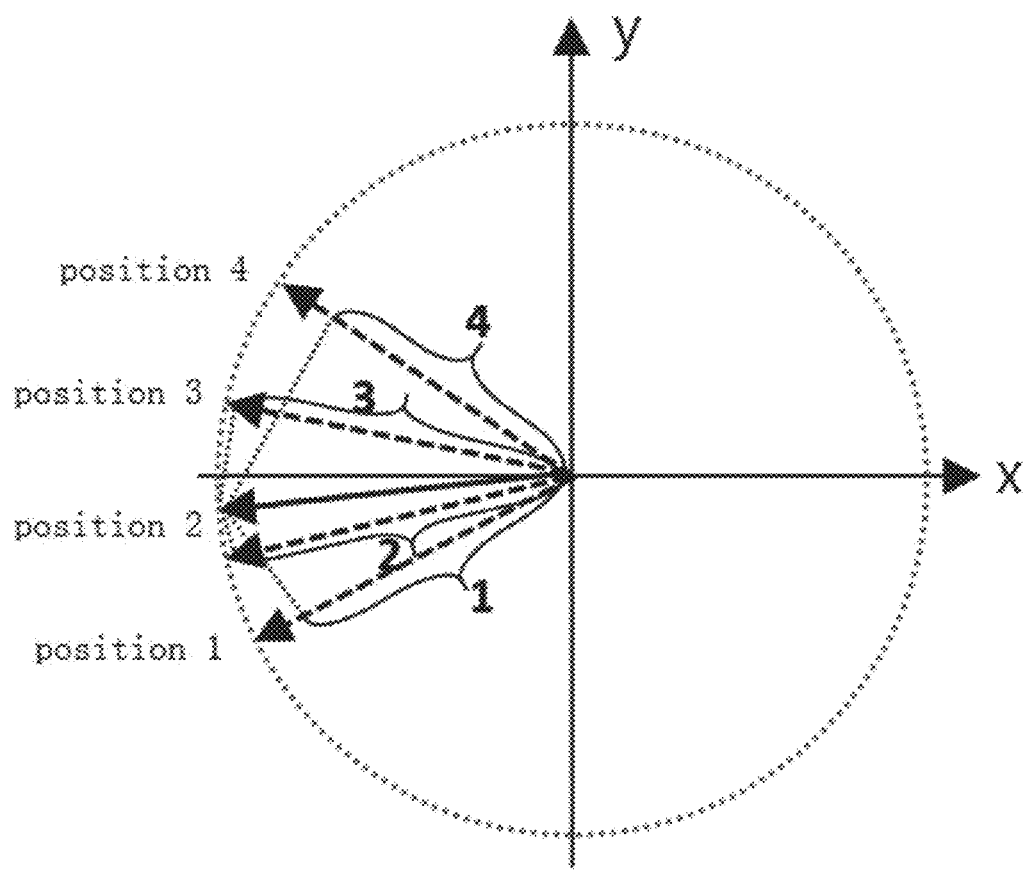
FIG. 6B is a schematic diagram of the energy projection of the normalized feature vectors corresponding to the user position on the feature vectors corresponding to predefined positions in the example embodiment shown in FIG. 6A.

Further, the normalized feature vectors corresponding to the four predefined positions and the normalized feature vector corresponding to the user position may be placed in the same coordinate system. As shown in FIG. 6A, the normalized feature vectors of predefined positions are represented by dotted arrows, and the normalized feature vector of the user position is represented by a solid arrow. It can be seen in the figure that the arrow corresponding to position 2 is closest to the arrow corresponding to the user position, so the normalized feature vector corresponding to the user position is considered to be closest (may also be understood as the most similar) to the normalized feature vector corresponding to position 2. In order to accurately measure the similarity between the normalized feature vector corresponding to the user position and the normalized feature vectors corresponding to predefined positions, the normalized feature vector corresponding to the user position should be projected on the normalized feature vectors corresponding to predefined positions, and the greater the projection energy, the higher the similarity. As shown in FIG. 6B, the normalized feature vectors of predefined positions are represented by dotted arrows, and the normalized feature vector corresponding to the user's position is represented by a solid arrow, the dotted lines represent energy projection operations, and the dotted segments corresponding to brackets 1, 2, 3 and 4 are the projection energy on predefined positions, wherein the greater the length of the projection energy, the higher the similarity. It can be seen from FIG. 6B that the projection energy corresponding to bracket 2 is the longest, that is, the normalized feature vector corresponding to the user position has the maximum projection energy on that corresponding to position 2, and the user position has the highest similarity with position 2, then position 2 is identified as the terminal device's position relative to the user. The result of position detection is obtained.

In the example embodiment of the present disclosure, after the terminal device's position relative to the user during the voice call is identified in the above method, a voice enhancement processing may be performed on the obtained voice signals by using a voice enhancement processing method that matches the identified position information, and the enhanced voice signal is transmitted to the opposite end of the voice call.

Figure 7:
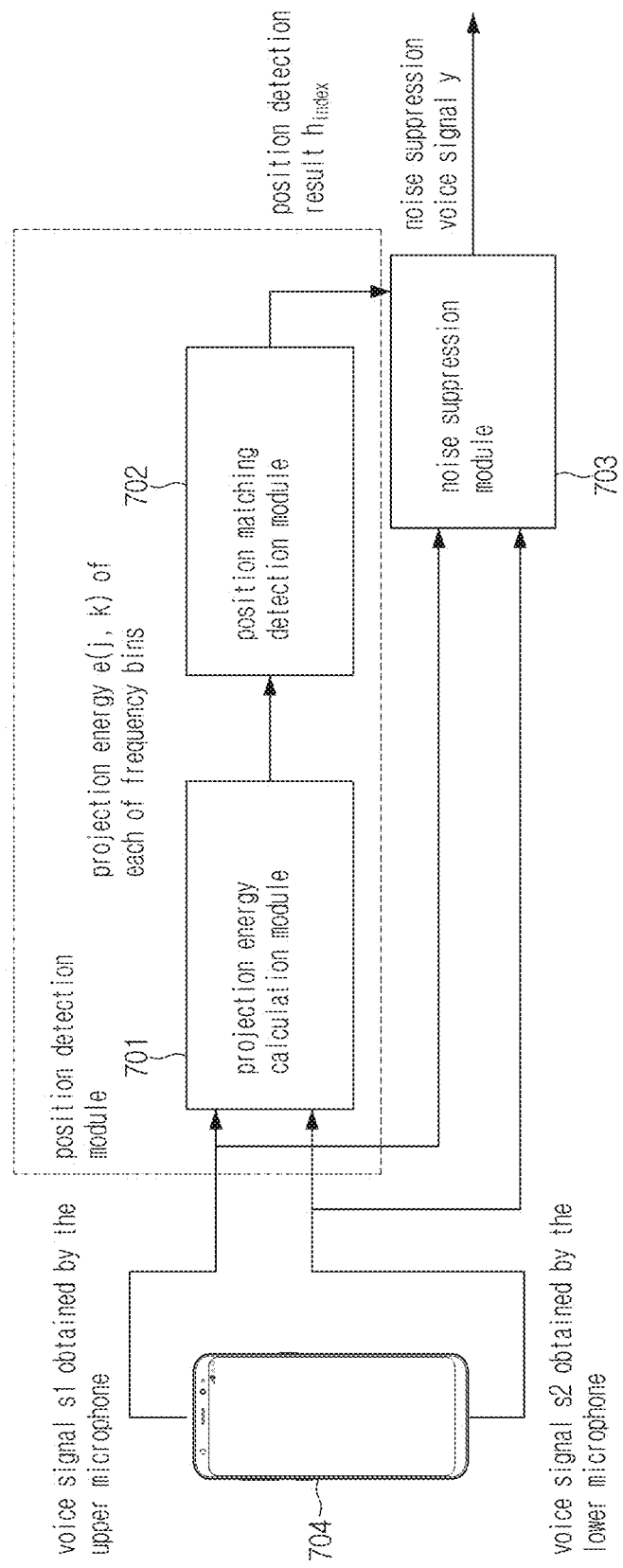
FIG. 7 is a schematic structural diagram of a call voice enhancement system according to an example embodiment of the present disclosure.

When the position detection result is used to enhance the call voice quality, the structure of the call voice quality enhancement system is shown in FIG. 7. The call voice quality enhancement system may include a projection energy calculation module 701, a position matching detection module 702, and a noise suppression module 703. Two microphones are provided on the call device 704, namely an upper microphone and a lower microphone. During a voice call, the voice signal obtained by the upper microphone is denoted as s1, and the voice signal obtained by the lower microphone is denoted as s2. The projection energy calculation module 701 calculates projection energy e(j, k) of each of frequency bins in the voice signal s1 and voice signal s2 corresponding to each of predefined positions, the position matching detection module 702 obtains the position detection result $h_{index}$ based on the projection energy of each of frequency bins, then the position detection result is input into the noise suppression module 703 as a reference for noise suppression processing, and finally a noise-suppressed voice signal y is output. The noise suppression module 703 uses this position detection result to avoid voice distortion caused by noise overestimation, thereby optimizing (or improving) the effect of noise suppression processing and improving the call voice quality.

Referring again to FIG. 7, the above-mentioned projection energy calculation module and the position matching detection module may constitute a position detection module, wherein the processing procedure of the projection energy calculation module is divided into two parts of an offline processing procedure and online processing procedure. The offline processing part may include presetting a plurality of predefined positions, and obtaining a normalized feature vector of each of predefined positions; the online processing part may include performing short-time Fourier transform (STFT) on the voice signals obtained from the microphones, combining the voice signals according to frequency bins and obtaining the normalized feature vector corresponding to each of frequency bins, and calculating the projection energy of the normalized feature vector corresponding to each of frequency bins on the normalized feature vector corresponding to each of predefined positions. The processing procedure of the position matching detection module may include weighting and summating the projection energy of all frequency bins to obtain the total projection energy of each of predefined positions, and selecting a position corresponding to the maximum projection energy to obtain the terminal device's position relative to the user. The above two modules in the position detection module will be described respectively in detail below.

In an alternative example embodiment of the present disclosure, the obtaining projection energy of the voice signal corresponding to each of the predefined positions includes: obtaining projection energy of each of frequency bins corresponding to each of the predefined positions; obtaining weight of each of the frequency bins; and determining projection energy of the voice signal corresponding to each of the predefined positions, based on the projection energy of each of the frequency bins corresponding to each of the predefined positions and the weight of each of the frequency bins.

The projection energy of each of the frequency bins corresponding to each of the predefined positions is obtained in the projection energy calculation module, the weight of each of frequency bins is obtained to identify the projection energy of the voice signal corresponding to each of predefined positions, and the terminal device's position relative to the user is further identified in the position matching detection module, and the position detection result is obtained.

Specifically, for the acquisition of the projection energy of the voice signal corresponding to each of predefined positions, the general processing procedure is: obtaining at least two frequency domain signals corresponding to the voice signal; combining the feature values of frequency domain signals at the frequency bin to obtain the feature vector of the voice signal. The feature vector corresponding to the voice signal is obtained; the feature vector contains feature value corresponding to each of the frequency bins; the feature vector is normalized to obtain the normalized feature vector corresponding to the voice signal; according to the feature matrixes corresponding to normalized feature vector and each of predefined positions respectively, the projection energy of each of frequency bins corresponding to each of predefined positions is identified.

It should be noted that the un-normalized feature vector of each of the frequency bins and the feature matrixes corresponding to each of predefined positions may also be used to identify the projection energy of each of frequency bins corresponding to each of predefined positions, which is not limited in the example embodiment of the present disclosure.

Further, the feature values of each frequency domain signal at the frequency bin are combined to obtain the feature vector corresponding to the frequency bin, and then the projection energy of the frequency bin corresponding to each of predefined positions is identified based on the feature vector corresponding to the frequency bin and the feature matrixes corresponding to each of predefined positions at the frequency bin. According to the above method, the projection energies of all frequency bins corresponding to each of predefined positions may be identified.

Figure 8:
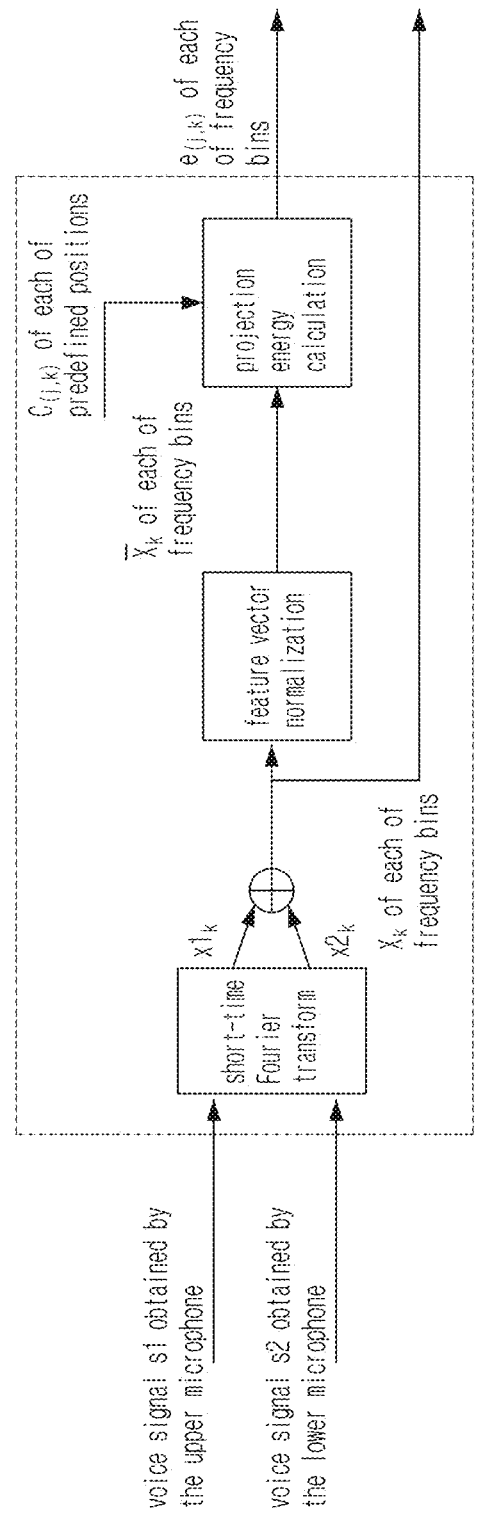
FIG. 8 is a schematic diagram of a processing procedure in a projection energy calculation module according to an example embodiment of the present disclosure.

Taking two voice collecting devices provided on the call device as an example to illustrate the obtainment of the projection energy of each of frequency bins. The two voice collecting devices are the upper microphone and the lower microphone, respectively. As shown in FIG. 8 firstly, the voice signal s1 obtained by the upper microphone and the voice signal s2 obtained by the lower microphone are framed and windowed and subjected to short-time Fourier transform, where the window length is L, to obtain corresponding two frequency-domain signals as $x1_k$ and $x2_k$, and the values of two signals at the same frequency bin are taken to form a vector $X_k=[x1_k, x2_k]$, which is the feature vector of the frequency bin, where $k=\{0, 1, 2, \ldots, L/2\}$ represents the frequency bins of 0 Hz-8000 Hz. Then, the feature vectors of the frequency bins are normalized, by only focusing on the phase information and ignoring the amplitude information, which may avoid the influence of the user's voice on the position detection. The expression of normalization is $\overline{X_k}=X_k/\sqrt{(X_k \cdot X'_k)}$, where $X'_k$ is the transpose of $X_k$. Finally, the projection energy of each of frequency bins is calculated based on the normalized feature vector of each of the frequency bins and the feature matrixes corresponding to each of predefined positions at the frequency bin: $e_{(j,k)}=\overline{X_k}*C_{(j,k)}*\overline{X'_k}$, where $e_{(j,k)}$ is the projection energy of frequency bin k in position j, and $C_{(j,k)}$ is the feature matrix corresponding to jth predefined position at frequency bin k.

In an alternative example embodiment of the present disclosure, before normalizing the feature vector, the method may further include: performing frequency response compensation on the feature vector based on a predefined compensation parameter to obtain an amplitude-corrected feature vector.

Specifically, the expression for amplitude correction of the feature vector at each of the frequency bins is: $X_k=[1, r_k]' \odot X_k$, where $\odot$ represents the point multiplication of the vectors, and $r_k$ is a fixed value (that is, the predefined compensation parameter), which represents the ratio of the frequency responses of different microphone hardware for a certain frequency. This step is to correct the difference of different microphone hardware. For example, if at a certain frequency bin k, the frequency response of the upper microphone is 2, and the frequency response of the lower microphone is 4, then the value of $r_k$ can be 2/4=0.5, so $X_k=[1,$ 0.5]'$\odot$[2,4]'=[2,2]. It can be seen that the amplitude of different microphones is corrected to the same level.

In an alternative example embodiment of the present disclosure, the feature matrixes corresponding to the predefined positions are obtained in the following manner: identifying a distance between a sample sound source and each of voice collecting devices; identifying the feature vector corresponding to the predefined position, based on the distance between the sample sound source and each of the voice collecting devices; and identifying the feature matrixes corresponding to the predefined positions based on the feature vector corresponding to the predefined positions.

The feature matrixes corresponding to each of the predefined positions at each of frequency bins are an autocorrelation matrix of the feature vectors corresponding to the predefined positions, and the feature vector of each of predefined positions at each of frequency bins is converted into the autocorrelation matrix (i.e., the feature matrix). The projection energy of each of frequency bins may be calculated more conveniently.

Figure 9:
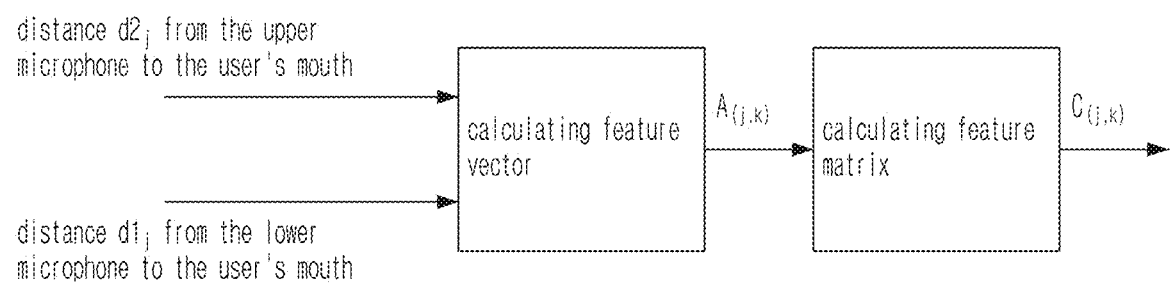
FIG. 9 is a schematic diagram of a feature matrix calculation process of a predefined position according to an example embodiment of the present disclosure.

Specifically, the calculation process of the feature matrix $C_{(j,k)}$ corresponding to each of predefined positions is shown in FIG. 9. First, a plurality of predefined positions are preset. Generally speaking, the range of angles corresponding to the predefined position is [−30°~60°], other angles are not commonly used in calls in handhold mode. The number of predefined positions (i.e., P) is selected by compromising complexity and performance. The example embodiment of the present disclosure takes P=4 as an example, which means j=0, 1, 2, 3. The numerical value of P is variable and may be selected according to actual needs. Then, the distance from the user's mouth to the upper microphone and the distance $d2_j$ from the user's mouth to the lower microphone are measured respectively, where the subscript j represents different predefined positions. Then, the normalized feature vector corresponding to each of the predefined positions is calculated. Each of the predefined positions j has a corresponding feature vector at each of the frequency bins k. The expression of the feature vector is:

$$A_{(j,k)} = \left[1, e^{i*2\pi*\left(\frac{k}{s}\right)*(d2_j-d1_j)}\right],$$

where $A_{(j,k)}$ is a 2*1 vector, and s represents the speed of sound (343 m/s). Finally, the feature matrixes corresponding to each of the predefined positions at the frequency bin k may be expressed as: $C_{(j,k)}=A_{(j,k)} \cdot A'_{(j,k)}$ where $C_{(j,k)}$ is a 2*2 matrix.

Further, in a situation where the terminal device includes three microphones, for example, the three microphones being respectively located at the upper part, lower part, and the side of the terminal device, for each of predefined positions, after obtaining the distance from the sound source to each microphone, the relative distance from the sound source (the user's mouth) to each microphone is calculated, where the relative distance from the sound source to each microphone is:

$$[0, d2_j-d1_j, d3_j-d1_1]$$

$d1_1$ is the distance from the sound source to the lower microphone in the predefined position j, $d2_1$ is the distance from the sound source to the side microphone in the predefined position j, and $d3_1$ is the distance from sound source to the upper microphone in the predefined position j. For example, for position 2, if the distance from the sound source to the lower microphone is 6 cm, the distance from the sound source to the side microphone is 10 cm, and the distance from the sound source to the upper microphone is 12 cm, the relative distance is [0, 4, 6].

Further, after calculating the relative distance from the sound source to each microphone, the feature vector at each specific frequency bin corresponding thereto, which is the feature vector corresponding to the predefined position at each specific frequency bin, is calculated as follows:

$$A_{(j,k)} = \left[1, e^{i*2\pi*\left(\frac{k}{s}\right)*(d2_j - d1_j)}, e^{i*2\pi*\left(\frac{k}{s}\right)*(d3_j - d1_j)}\right]$$

As shown above, $A_{(j,k)}$ is a 3*1 vector.

After obtaining the projection energies of the voice signals corresponding to each of the predefined positions at each of the frequency bins in the projection energy calculation module, the weight corresponding to each of the frequency bins is obtained in the position matching detection module to identify the projection energies of the voice signals corresponding to each of the predefined positions, then the terminal device's position relative to the user is further identified, and finally the position detection result is obtained. Specifically, there are two ways to obtain the weight corresponding to each of the frequency bins in the position matching detection module, one of which is to obtain the predefined weight corresponding to each of the frequency bins, and the other of which is to identify the weight corresponding to each of the frequency bins through the weight identification neural network based on the projection energy of each of the frequency bins corresponding to each of predefined positions and the projection energies and/or the position energy information of the voice signals.

Figure 10:
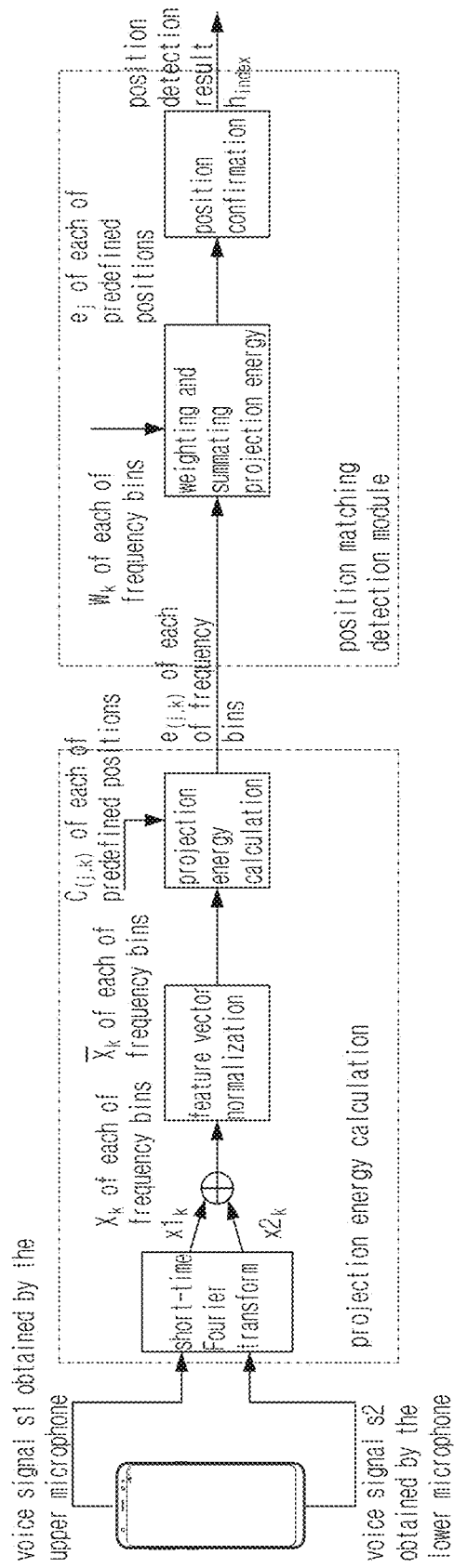
FIG. 10 is a schematic diagram of a position detection process when the weight of each of frequency bins is a predefined weight according to an example embodiment of the present disclosure.

Specifically, when the weight corresponding to each of the frequency bins is a predefined weight, the position detection process of the position detection module in the example embodiment of the present disclosure is shown in FIG. 10. The predefined weight corresponding to each of frequency bins may be w=[0, 0, . . . , 0, 1, 1, . . . , 1, 0, 0, . . . , 0], the number 0 in the front is M, the number 1 in the middle is N, and the number 0 in the back is Z. Where, M=floor(800*L/fs), N=floor(4000*L/fs)−M, Z=floor(L/2)+1−M−N; L is a window length, fs is the sampling frequency of the voice acquisition device. Only the weights of frequency bins of 800~4000 Hz is set to 1, and the others are set to 0, since the frequency range of 800~4000 Hz contains the most voice components, and other frequencies have more noise components. The weight corresponding to each of the frequency bins uses a predefined weight, which can reduce the computation complexity of the position detection process.

Figure 11:
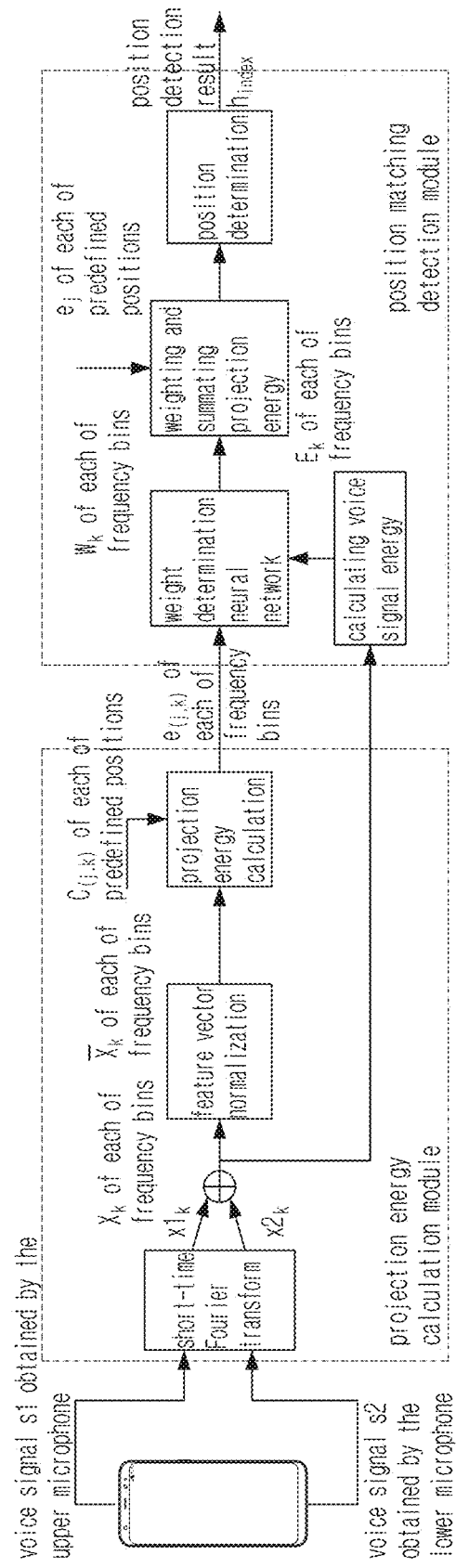
FIG. 11 is a schematic diagram of a position detection process when the weight of each of frequency bins is identified by a neural network according to an example embodiment of the present disclosure.

Specifically, when the weight corresponding to each of the frequency bins is identified through the weight identification neural network, the position detection process of the position detection module in the example embodiment of the present disclosure is shown in FIG. 11. The energy of the voice signals at each of the frequency bins is calculated by the equation: $E_k = X_k \cdot X'_k$, and the projection energy e(j,k) of the voice signals at each of the frequency bins corresponding to each of the predefined positions output by the projection energy calculation module and the energy $E_k$ of each of the frequency bins are input to the weight identification neural network, and the weight $w_k$ corresponding to each of the frequency bins is output.

The reason for assigning different weights for different frequency bins is as follows: frequency bins correspond to different voice components respectively, some frequency bins contain more noise components, and some frequency bins contain more voice components. The frequency bins containing more voice components, which is more important for position detection, will be assigned a greater weight. In contrast, the frequency bins containing more noise components will be assigned a lower weight. This method of assigning different weights for different frequency bins can improve the accuracy of position detection in a strong noise environment.

Figure 12:
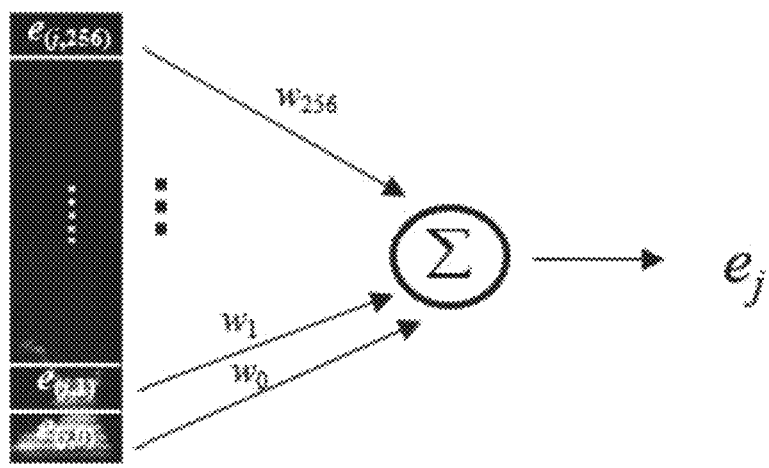
FIG. 12 is a schematic diagram of projection energy accumulation according to an example embodiment of the present disclosure.

Further, after the weights corresponding to frequency bins are obtained through the above two weight obtainment methods, for each of the predefined positions, the projection energy of each of the frequency bins corresponding to the predefined position is weighted according to the weight corresponding to each of the frequency bins; for each of the predefined positions, the weighted projection energy of all frequency bins corresponding to the predefined position are accumulated to obtain the projection energy of the voice signal corresponding to the predefined position. It may be expressed by the following equation: $e_1 = \sum_k w_k \cdot e_{(j,k)}$. When the voice signal contains 257 frequency bins (k=0256), the calculation of $e_1$ is shown in FIG. 12.

Finally, the predefined position corresponding to the maximum position energy information is selected to obtain the position of the terminal device relative to the user during the voice call. Specifically, the maximum value among ej={e0, e1, . . . , eP−1} is selected, and the subscript of the selected maximum value is the final detection result, which is the current terminal device position: $h_{index}$=argmax($e_j$), where index={0, 1, . . . , P−1}.

In an alternative example embodiment of the present disclosure, the weight identification neural network includes a control subnetwork and a calculation subnetwork. A SNR characteristic value of the voice signal is identified through the control subnetwork, based on the position energy information of the voice signals. Whether the weight of each of the frequency bins is a predefined weight is identified based on the SNR characteristic value. When the weight of each of the frequency bins is not the predefined weight, the weight of each of the frequency bins is identified though the calculation subnetwork based on the projection energy of each of frequency bins corresponding to each of the predefined positions.

Figure 13:
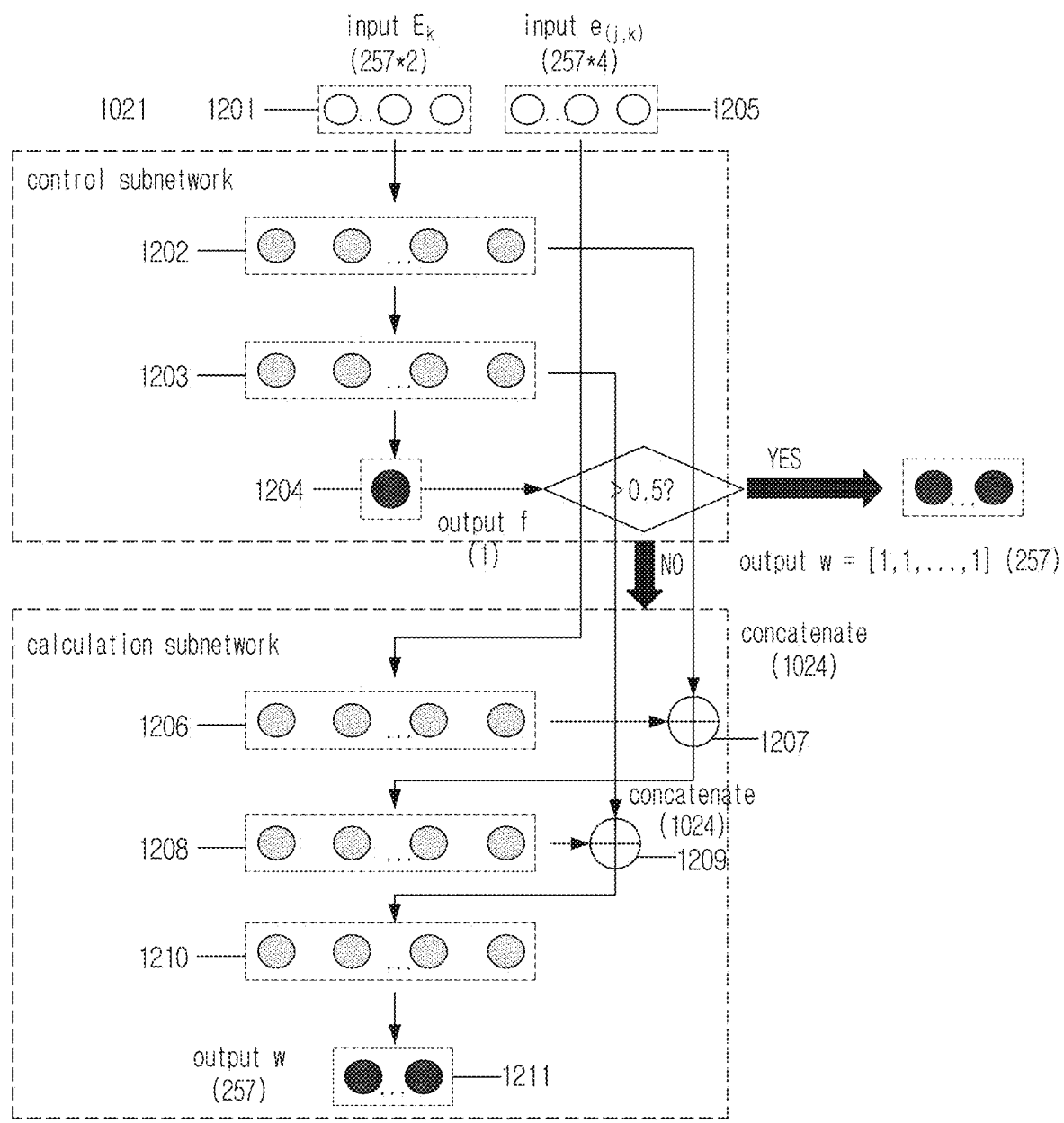
FIG. 13 is a schematic structural diagram of a weight identification neural network according to an example embodiment of the present disclosure.

The control subnetwork and the calculation subnetwork are concatenated through a concatenate layer. FIG. 13 shows the structure diagram of the weight identification neural network in an example. In this example, four predefined positions are preset, the sampling rate of two voice acquisition devices is 16 kHz, and the window length is 512 frequency bins. The input layer of the control subnetwork may contains 514 nodes, which specifically are energy Ek of the frequency bins (the upper and lower microphone signals respectively corresponding to 257 frequency bins), and the output layer contains one node, which specifically is a control flag bit f (i.e., the characteristic value of the SNR). The input layer of the calculation subnetwork contains 1258 nodes, which specifically are the projection energy e(j,k) of 1028 frequency bins (4 predefined positions corresponding to 257 frequency bins in the frequency domain), and the output layer contains 257 nodes, which specifically is the weight wk of 257 frequency bins.

Specifically, if the SNR characterization value f output by the control subnetwork is not less than the preset threshold, the calculation process of the calculation subnetwork may be skipped, and the weight of each of frequency bins may be directly set as one (w=[1, 1, . . . , 1]). If the SNR characterization value f output by the control subnetwork is less than the preset threshold value, it is input to the calculation subnetwork for calculation to obtain the weight of each of the frequency bins. The preset threshold may be set to 0.5.

It should be noted that the purpose of adding the control subnetwork in the design of the weight identification neural network is to reduce the computation complexity of the neural network, thereby saving device power consumption. For example, in very quiet environments (such as at home, in the office, etc.) which have little background noise, there is less need to calculate the weight w corresponding to each frequency bin accurately to obtain better position detection results, and the exact position may be detected by only setting w to [1, 1, . . . , 1]. Therefore, during the operation of the weight identification neural network, it may identify the environment noise magnitude according to the SNR characterization value output by the control subnetwork. When the environmental noise is small (that is, the SNR characterization value is not less than the preset threshold), the calculation subnetwork is skipped and the weight of each of frequency bins is set to 1 directly, which may greatly reduce the computational complexity. The weight identification neural network may also obtain the weight of each of the frequency bins when only including the calculation subnetwork, without taking the calculation complexity into account.

In an alternative example embodiment of the present disclosure, the control subnetwork performs feature extraction on the position energy information of the voice signal through a plurality of cascaded first feature extraction layers and obtains the SNR characteristic value based on the extracted features through a classification layer.

The calculation subnetwork performs feature extraction on the projection energy of each of the frequency bins corresponding to each of the predefined positions through a plurality of cascaded second feature extraction layers and obtains the weight of each of the frequency bins based on the extracted features through a linear regression layer.

The second feature extraction layer concatenates the extracted features with the features output by the corresponding first feature extraction layer in the control subnetwork, and outputs the concatenated features.

Specifically, referring again to FIG. 13, the control subnetwork in the weight identification neural network includes a control subnetwork input layer 1201, two first feature extraction layers (i.e., fully connected layers) 1202 and 1203, and a control subnetwork output layer (i.e., classification layer) 1204. Specifically, the control subnetwork input layer 1201 is used to receive the input energy of each of the frequency bins, the first feature extraction layer 1202 is used to extract the corresponding lower-layer features from the input energy of each of the frequency bins, the first feature extraction layer 1203 is used to extract corresponding higher-layer features from the energy of each of the frequency bins based on the lower-layer features input by the first feature extraction layer 1202, and the control subnetwork output layer 1204 is used to output the corresponding SNR characterization value based on the higher-layer features input by the first feature extraction layer 1203. The calculation subnetwork in the weight identification neural network includes a calculation subnetwork input layer 1205, three second feature extraction layers (i.e., fully connected layers) 1206, 1208, and 1210, two concatenate layers 1207 and 1209, and a calculation subnetwork output layer 1211. Specifically, the calculation subnetwork input layer 1205 is used to receive the input projection energy of each of the frequency bins, the second feature extraction layer 1206 is used to extract the corresponding lower-layer features from the input projection energy of each of the frequency bins, the concatenate layer 1207 is used to concatenate the lower-layer features extracted by the first feature extraction layer 1202 and the lower-layer features extracted by the second feature extraction layer 1206, the second feature extraction layer 1208 is used to extract corresponding higher-layer features based on the two lower-layer features input by the concatenate layer 1207, the concatenate layer 1209 is used to concatenate the higher-layer features extracted by the first feature extraction layer 1203 and the higher-layer features extracted by the second feature extraction layer 1208, and the second feature extraction layer 1210 is used to identify the weight of each of the frequency bins based on the two higher-layer features input by the concatenate layer 1209 and output it through a calculation subnetwork output layer 1211. The corresponding number of nodes and activation functions of each network layer in this example are listed in Table 3 below.

TABLE 3

| Network layer | The number of nodes and activation function |
|---|---|
| Control subnetwork input layer 1201 | Energy Ek of the voice signal at respective frequency bins (514 nodes) |
| First feature extraction layer 1202 | Fully connected layer (512 nodes), ReLU activation function |
| First feature extraction layer 1203 | Fully connected layer (512 nodes), ReLU activation function |
| Control subnetwork output layer 1204 | Fully connected layer (1 node), Sigmoid activation function |
| Calculation subnetwork input layer 1205 | Projection energy $e_{(j, k)}$ of each of frequency bins corresponding to each of the predefined positions (1208 nodes) |
| Second feature extraction layer 1206 | Fully connected layer (512 nodes), ReLU activation function |
| Concatenate layer 1207 | Fully connected layer (512 + 512 nodes) |
| Second feature extraction layer 1208 | Fully connected layer (512 nodes), ReLU activation function |
| Concatenate layer 1209 | Fully connected layer (512 + 512 nodes) |
| Second feature extraction layer 1210 | Fully connected layer (512 nodes), ReLU activation function |
| Calculation subnetwork output layer 1211 | Fully connected layer (257 nodes), Sigmoid activation function |

It should be noted that the network layer structure of the weight identification neural network is only an example. In practice, the weight identification neural network may also use a Convolutional Neural Network (CNN), a Recurrent Neural Network (RNN), a Residual Network (ResNet), or other neural networks.

Before obtaining the weight of each of frequency bins by using the weight identification neural network, the weight identification neural network may be trained. In the process of training the weight-identifying neural network, since the weight identification neural network includes a control subnetwork and a calculation subnetwork, there are two labels used for training, which are the SNR characterization value f output by the control subnetwork and the weight $\hat{w}_k$ of each of the frequency bins output by the calculation subnetwork. Specifically, a voice signal sample is obtained first, and then the noise ratio characterization value f of the voice signal sample and the weight $\hat{w}_k$ of the voice signal sample at each of the frequency bins are obtained. That is, the sample data for training is obtained. The expression of the loss function used in the training process is as follows:

$$\text{Loss} = \begin{cases} (f-\hat{f})^2, & \text{if } \hat{f}=1 \\ (f-\hat{f})^2 + (w-\hat{w})^2, & \text{if } \hat{f}=0 \end{cases}$$

For the characterization value f of the SNR of the voice signal sample, if the SNR corresponding to the voice signal sample is greater than 10 dB, it can be considered that the energy of the user's voice contained in the voice sample is much greater than the energy of the noise, which means that the user is in a quiet environment. Accordingly, f̂ is set to 1. If the SNR corresponding to the voice signal sample is not greater than 10 dB, it can be considered that the energy of the user's voice contained in the voice sample is not much greater than the energy of the noise, which means that the user is in a noisy environment. Accordingly, f̂ is set to 0. Specifically, f̂ is calculated using the following expression:

$$\hat{f} = \begin{cases} 1, & \text{if } SNR > 10 \text{ dB} \\ 0, & \text{if } SNR \le 10 \text{ dB} \end{cases}$$

If the voice signal sample contains 257 frequency bins (k=0~256), then the calculation formula of SNR is:

$$SNR = 10\log_{10}\left(\frac{\sum_{k=0}^{256} Y_k}{\sum_{k=0}^{256} N_k}\right)$$

$Y_k$ is energy of the user voice at the frequency bin k, and $N_k$ is the energy of the noise at the frequency bin k.

For the weight $\hat{w}_k$ of each of frequency bins in the voice signal sample, it is assumed that 4 predefined positions (j=0~3) are preset, if the projection energies e(0,k), e(1,k), e(2,k), e(3,k) corresponding to frequency bin k are more important for obtaining more accurate position results, a higher weight $\hat{w}_k$ is assigned to the projection energy corresponding to frequency bin k. Specifically, $\hat{w}_k$ may be calculated in two steps:

In a first step (step 1), the initial weight of frequency bin k is calculated according to the following formula, to ensure that the frequency bin with less noise will obtain a larger initial weight value:

$$\max(\min\left(\frac{Y_k}{E_k}, 1\right), 0)/2$$

$Y_k$ is energy of the user voice at the frequency bin k, and $E_k$ is the energy of the voice signal at the frequency bin k.

Specifically, if the voice signal sample contains 257 frequency bins (k=0~256), and 4 predefined positions (j=0~3) are preset, then the initial weight of each of frequency bins is:

$$\hat{w}_0 = \max(\min\left(\frac{Y_0}{E_0}, 1\right), 0)/2,$$

$$\hat{w}_1 = \max(\min\left(\frac{Y_1}{E_1}, 1\right), 0)/2,$$

$$\hat{w}_2 = \max(\min\left(\frac{Y_2}{E_2}, 1\right), 0)/2,$$

$$\hat{w}_3 = \max(\min\left(\frac{Y_3}{E_3}, 1\right), 0)/2, \ldots,$$

$$\hat{w}_{256} = \max(\min\left(\frac{Y_{256}}{E_{256}}, 1\right), 0)/2.$$

In a second step (step 2), the initial weight value of the frequency bin k is adjusted according to the magnitude of the projection energy of the frequency bin k in each of the predefined positions.

Figure 14:
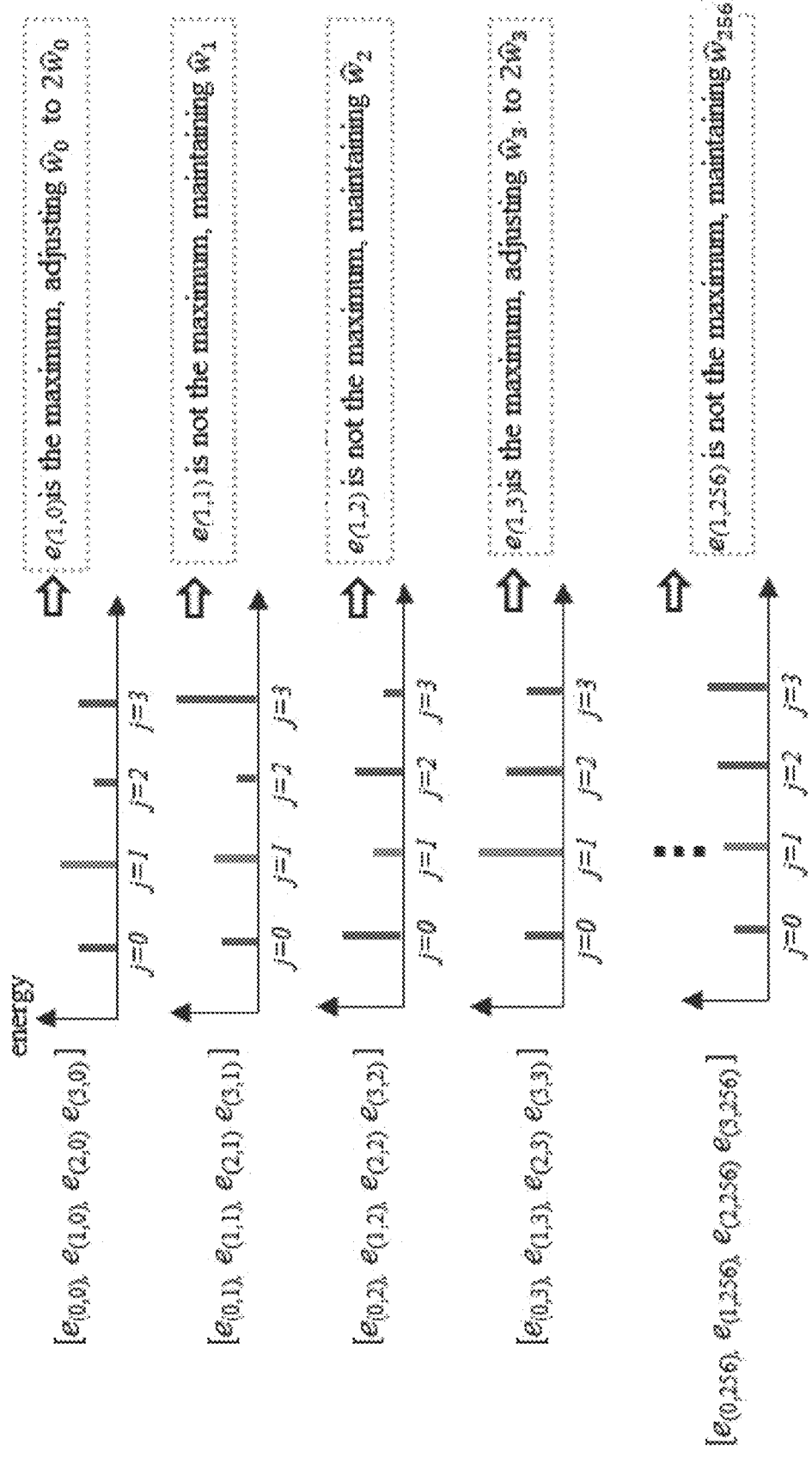
FIG. 14 is a schematic diagram of adjusting the initial weight value according to an example embodiment of the present disclosure.

Specifically, if the second position in the predefined positions (i.e., j=1) is the target position (i.e., the actual position of terminal device's relative to the user), and e(1,k) is the maximum of [e(0,k), e(1,k), e(2,k) e(3,k)], [e(0,k), e(1,k), e(2,k) e(3,k)] and is more important for obtaining a more accurate position result, then the weight of frequency bin k is adjusted from the initial weight value $\hat{w}_k$ to $2\hat{w}_k$. FIG. 14 shows the adjustment in this example.

Figure 15:
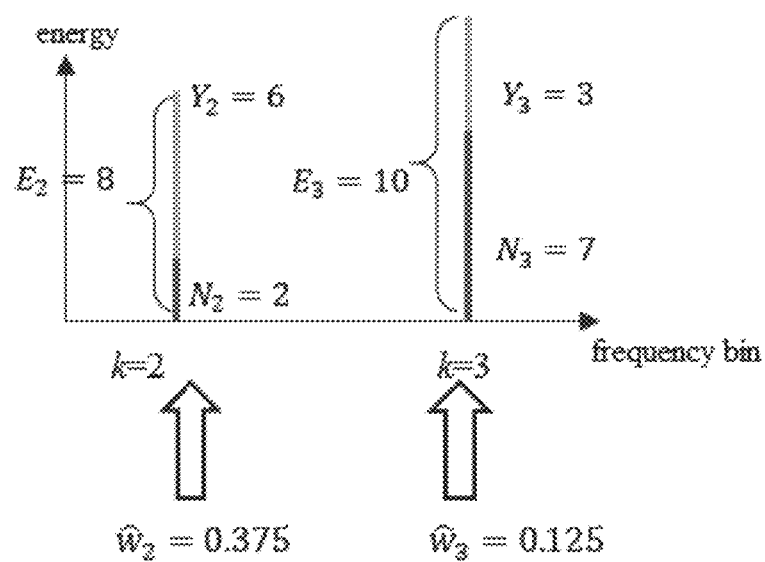
FIG. 15 is a schematic diagram of energy corresponding to two frequency bins according to an example embodiment of the present disclosure.

For a further example, for step 1, as shown in FIG. 15, if k=2, $Y_2$=6, $N_2$=2, and $E_2$=8, then $$\hat{w}_2 = \frac{\frac{Y_2}{E_2}}{2} = \frac{0.75}{2} = 0.375,$$

and if k=3, $Y_3$=3, $N_3$=7, and $E_3$=10, then $$\hat{w}_3 = \frac{\frac{Y_3}{E_3}}{2} = \frac{0.3}{2} = 0.15.$$

Where, $\hat{w}_2 > \hat{w}_3$ indicates that the user's voice energy ratio (6/8) at frequency bin 2 is greater than user's voice energy ratio (3/10) at frequency bin 3, so the frequency bin 2 is more important when weighting projection energy corresponding to each of predefined positions in the position matching detection module. It further illustrates that at frequency bin k, the greater the ratio of the user's voice energy, the greater the initial weight. This is mainly because if the user's voice energy ratio in the frequency bin is higher, the noise influence in this frequency bin is smaller, and the position detection result corresponding to this frequency bin is more accurate, so the frequency bin should be assigned a higher initial weight. Otherwise, a lower weight should be assigned to reduce the influence of noise.

Through the calculation formula of the initial weight value, the initial weight value ranges from 0~1 to eliminate some abnormal values in the coding process.

The initial weight value equals to half of $$\max\left(\min\left(\frac{Y_k}{E_k}, 1\right), 0\right),$$

since the initial weight of the frequency bins that meet the conditions will be multiplied by 2 in the next step to get the final weight label. It may ensure that the final weight label ranges from 0~1. Since the weight identification neural network outputs the weight of each of frequency bins through the activation function Sigmoid, and the output of the activation function Sigmoid ranges from 0~1, it might be necessary to limit the weight label to range from 0~1.

For step 2, if the real position of the terminal device relative to the user is the predefined position q, and e(q,k) is the maximum among e(j,k), (j=0, 1, 2, 3) for the frequency bin k, then the weight of frequency bin k should be larger. If e(q,k) is the maximum, then it means that the frequency bin k is more important for detecting the real user position, and the frequency bin k should be assigned a higher weight value.

Figure 16A:
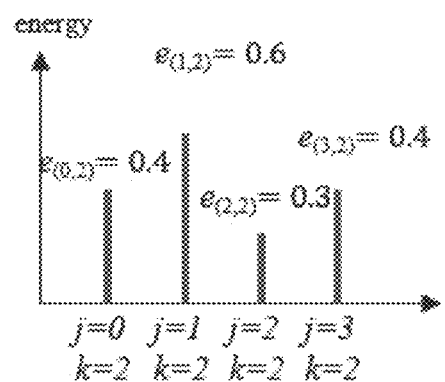
FIG. 16A is a schematic diagram of projection energy of the frequency bin 2 on each of predefined positions according to an example embodiment of the present disclosure.
Figure 16B:
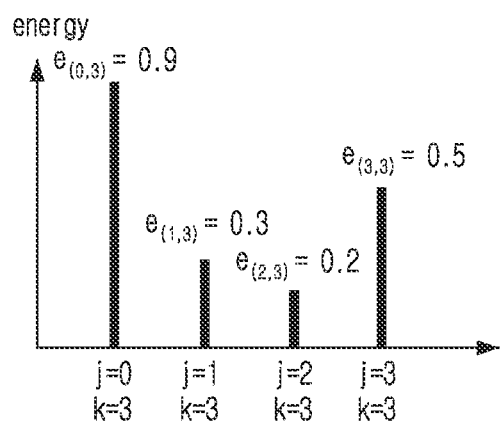
FIG. 16B is a schematic diagram of projection energy of the frequency bin 3 on each of predefined positions according to an example embodiment of the present disclosure.

The following will assume the real position of the terminal device relative to the user as being the second predefined position (that is, q=1) and $\hat{w}_2$ and $\hat{w}_3$ as an example for illustration. In FIG. 16A, it can be seen that e(1,2) is the maximum, so $\hat{w}_2 = 2\hat{w}_2 = 2 \cdot 0.375 = 0.75$, that is, the weight of frequency bin 2 is adjusted to twice the initial weight value. In FIG. 16B, e(0,3) is the maximum, rather than e(1,3), so $w_3 = 0.15$, that is, the weight of frequency bin 3 is maintained as the initial weight.

In order to simplify the above example, it is assumed that the voice signal sample contains only two frequency bins (k=2, 3), and the weight identification neural network outputs a weight which is the same as the label below.

If the weight obtained in step 1 is directly used to calculate the projection energy ej in each of predefined positions without adjusting the initial weight of step 2, then the calculation result is as follows:

$e_0 = e_{(0,2)} \times 0.375 + e_{(0,3)} \times 0.15 = 0.285$ $e_1 = e_{(1,2)} \times 0.375 + e_{(1,3)} \times 0.15 = 0.27$ $e_2 = e_{(2,2)} \times 0.375 + e_{(2,3)} \times 0.15 = 0.143$ $e_3 = e_{(3,2)} \times 0.375 + e_{(3,3)} \times 0.15 = 0.225$ If the weight adjusted in step 2 is used to calculate the projection energy ej, then the calculation result is as follows:

$_0 = e_{(0,2)} \times 0.75 + e_{(0,3)} \times 0.15 = 0.435$ $e_1 = e_{(1,2)} \times 0.75 + e_{(1,3)} \times 0.15 = 0.495$ $e_2 = e_{(2,2)} \times 0.75 + e_{(2,3)} \times 0.15 = 0.255$ $e_3 = e_{(3,2)} \times 0.75 + e_{(3,3)} \times 0.15 = 0.375$ It can be seen from the above calculation results that $e_0$ is the maximum when step 2 is not performed, but the position detection result is the first predefined position, which is incorrect; $e_1$ is the maximum when step 2 is performed, and the position detection result is the second predefined position, which is correct. Therefore step 2 can improve the accuracy of position detection.

Figure 17:
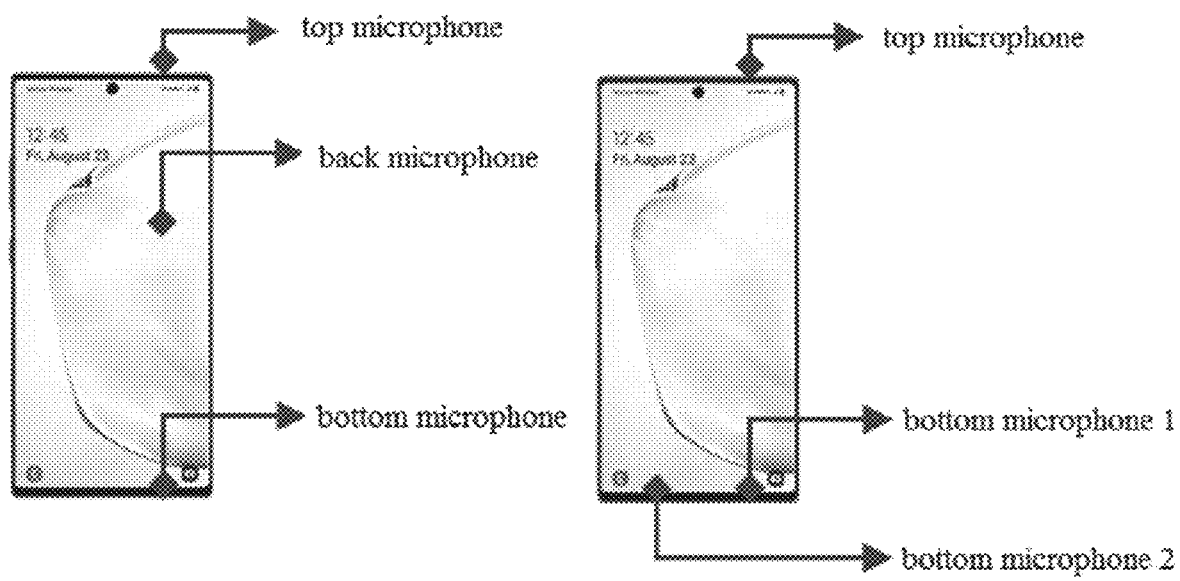
FIG. 17 is a schematic diagram of a terminal device including three microphones according to an example embodiment of the present disclosure.

It should be noted that the position detection method according to the example embodiments of the present disclosure is not only applicable to the situation where two voice collecting devices are included in the above example, but also applicable to the situation where three or more voice collecting devices are included. As shown in FIG. 17, many existing terminal devices are equipped with three voice collecting devices. The three voice collecting devices of the terminal device shown on the left of the figure are the top microphone, the bottom microphone, and the back microphone. The three voice collecting devices of the terminal device shown on the right of the figure are a top microphone and two bottom microphones (bottom microphone 1 and bottom microphone 2).

Figure 18:
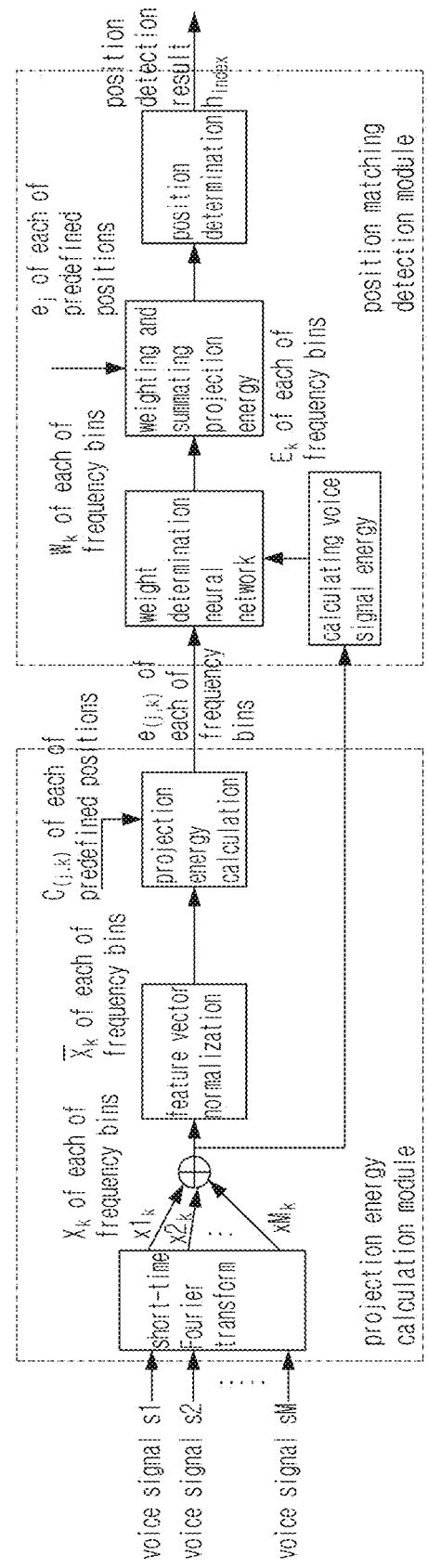
FIG. 18 is a schematic diagram of a position detection method in a situation including three or more voice collecting devices according to an example embodiment of the present disclosure.

For a situation including three or more voice obtainment devices, the principle of the corresponding position detection method is similar to the previous description. Specifically, the implementation process of the position detection may be shown in FIG. 18, where the processing procedure in the position matching detection module is the same as that in the situation of two voice collecting devices, and the processing procedure in the projection energy calculation module has a slight difference with that in the situation of two voice collecting devices. Specifically, in the projection energy calculation module, first, the voice signals (s1, s2, . . . , sM) obtained by a plurality of voice collecting devices (microphones) are framed and windowed and subjected to short-time Fourier transform, where the window length is L. A plurality of frequency domain signals x1k, x2k, . . . , xnk, . . . , xMk are obtained, and values of a plurality of signals at the same frequency bin are taken and form a vector $X_k = [x1_k, x2_k, xn_k, \ldots, xM_k]$, which is the feature vector of the frequency bin, where $$k = \{0, 1, 2, \ldots, \frac{L}{2} - 1\}$$

represents the frequency bin of 0 Hz~8000 Hz. Then, the amplitude correction is performed on the feature vector of each of frequency bins: $X_k = [1, \ldots, r1n_k, \ldots, r1M_k]' \odot X_k$, where $\odot$ represents the point multiplication of the vectors, $r1n_k$, which is a fixed value, and represents the ratio of the frequency responses of different microphone hardware for a certain frequency. The above step is to correct the difference of different microphone hardware. For example, if the frequency response of microphone 1 is 2 and the frequency response of microphone 2 is 4 at a certain frequency bin k, the value of $r1n_k$ should be 0.5. Then, the feature vectors of frequency bins are normalized, by only focusing on the phase information and ignoring the amplitude information. The expression of the normalization is $X_k = X_k / \sqrt{(X_k \cdot X'_k)}$, where $X'_k$ is the transpose of $X_k$. Finally, the projection energy corresponding to each of frequency bins is calculated based on the normalized feature vector of each of frequency bins and the feature matrix corresponding to each of predefined positions at the frequency bin: $e_{(j,k)} = \overline{X_k} * C_{(j,k)} * \overline{X_k}'$, where $e_{(j,k)}$ is the projection energy of frequency bin k in position j.

For a situation including three or more voice collecting devices, the process of obtaining the feature matrix of the predefined position may include the following steps. First, a distance $d1_j$ from the user's mouth to the first microphone, and a distance $d2_j$ from the user's mouth to the second and a distance $dn_j$ from the user's mouth to the nth microphone are measured, where the subscript j represents different positions. Then, a normalized feature vector corresponding to each predefined position is calculated, and there is a corresponding feature vector for each combination of position j and frequency bin k, and the expression is:

$$A_{(j,k)} = \left[1, \ldots, e^{i*2\pi*\left(\frac{k}{s}\right)*(dn_j - d1_j)}, \ldots, e^{i*2\pi*\left(\frac{k}{s}\right)*(dM_j - d1_j)}\right],$$

where $A_{(j,k)}$ is an M*1 vector, and s represents the speed of sound (343 m/s). Finally, the characteristic matrix corresponding to each predefined position: $C_{(j,k)} = A_{(j,k)} \cdot A'_{(j,k)}$, where $C_{(j,k)}$ is a M*M matrix.

Figure 19:
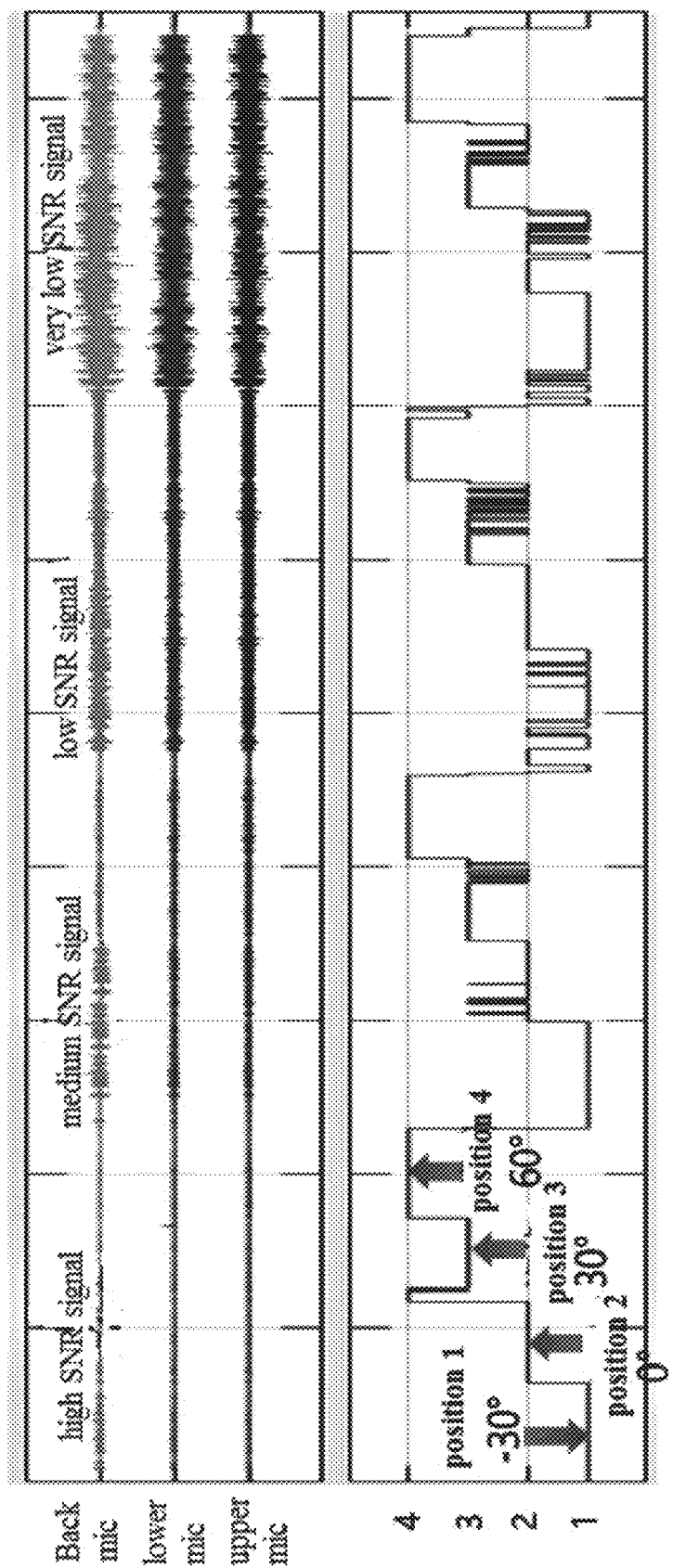
FIG. 19 is a schematic diagram of a waveform and a position detection structure of voice signals obtained by microphones according to an example embodiment of the present disclosure.

The following is a test example to illustrate the beneficial effects of the position detection method according to the example embodiments of the present disclosure. It is assumed that the terminal device used by a user is the terminal device shown on the left of FIG. 17 and contains three microphones, each of which is the top microphone (corresponding to the upper microphone in FIG. 19), the bottom microphone (corresponding to the lower microphone in FIG. 19) and the back microphone (corresponding to the back microphone in FIG. 19). It is assumed that at least four predefined positions as shown in FIGS. 5A-5C are pre-set in the projection energy calculation module. During the test, as shown in FIG. 19, the upper part of the figure shows the waveforms of the voice signals obtained by the three microphones, which is divided into four segments. The four segments correspond to different SNRs (from left to right: high SNR, medium SNR, low SNR, and very low SNR) respectively, and each segment is divided into four small segments, corresponding to the four positions of the user (from left to right: predefined position 1, predefined position 2, predefined position 3, and predefined position 4). The terminal device's position relative to the user during a voice call is identified by using the position detection method of the example embodiments of the present disclosure, based on the voice signals obtained by the above three microphones, and the detection result is shown in the lower part of FIG. 19. It can be seen that high detection accuracy may still be maintained even at low SNR or extremely low SNR.

Therefore, by using the position detection method according to the example embodiments of the present disclosure to guide the multi-microphone voice enhancement module, the performance degradation caused by the inability to identify the terminal device's position relative to the user can also be avoided even in a high-noise or extremely high-noise environment, so as to maximize the advantages of the multi-microphone and get better voice enhancement effect for calls.

Figure 20:
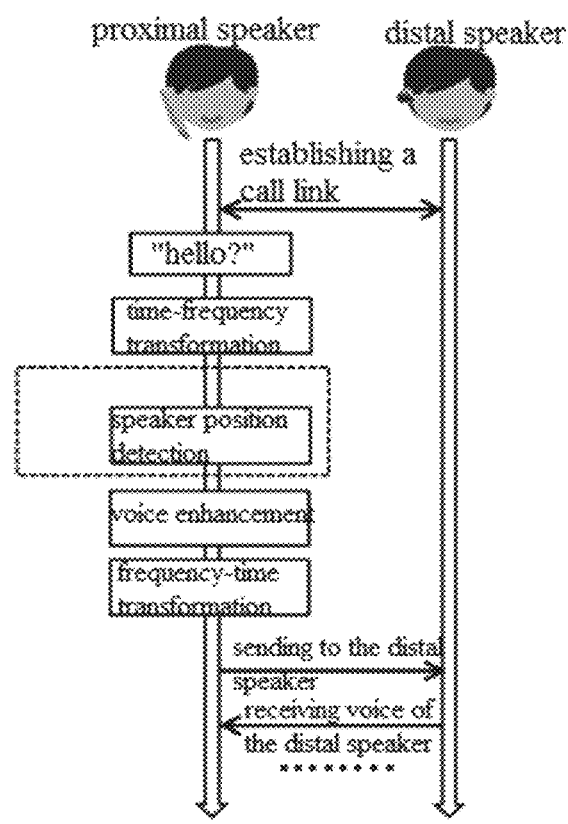
FIG. 20 is a schematic diagram of a voice call process according to an example embodiment of the present disclosure.

The following uses an example to illustrate the position detection and the call voice quality enhancement in a voice call scenario. As shown in FIG. 20, a proximal speaker (i.e., the user in this example embodiment of the present disclosure) establishes a call link with a distal speaker. After the proximal speaker utters a voice, the "time-frequency transformation" is performed first to convert the voice signals obtained by a plurality of microphones from the time domain to the frequency domain. The position of the terminal device relative to the proximal speaker handholding the terminal device is detected through the frequency domain spectrum of a plurality of microphone signals. The terminal device's position detection in the dotted block in the figure adopts the position detection method provided in the example embodiment of the present disclosure. The detection result then is used to guide the call voice enhancement module to perform call voice enhancement, and the enhanced single channel voice frequency spectrum is output. "Frequency-time transformation" is performed on the enhanced voice frequency spectrum to convert the enhanced voice frequency spectrum to the time domain. Finally, a clean voice is transmitted to the distal speaker.

At the same time, the example embodiment of the present disclosure also provides another position detection method. During a voice call, the distances between the user's mouth and different microphones are different, which means that the time delays at different microphones are also different. Therefore, this feature during the voice call may be used to detect the terminal's position relative to the user.

Figure 21:
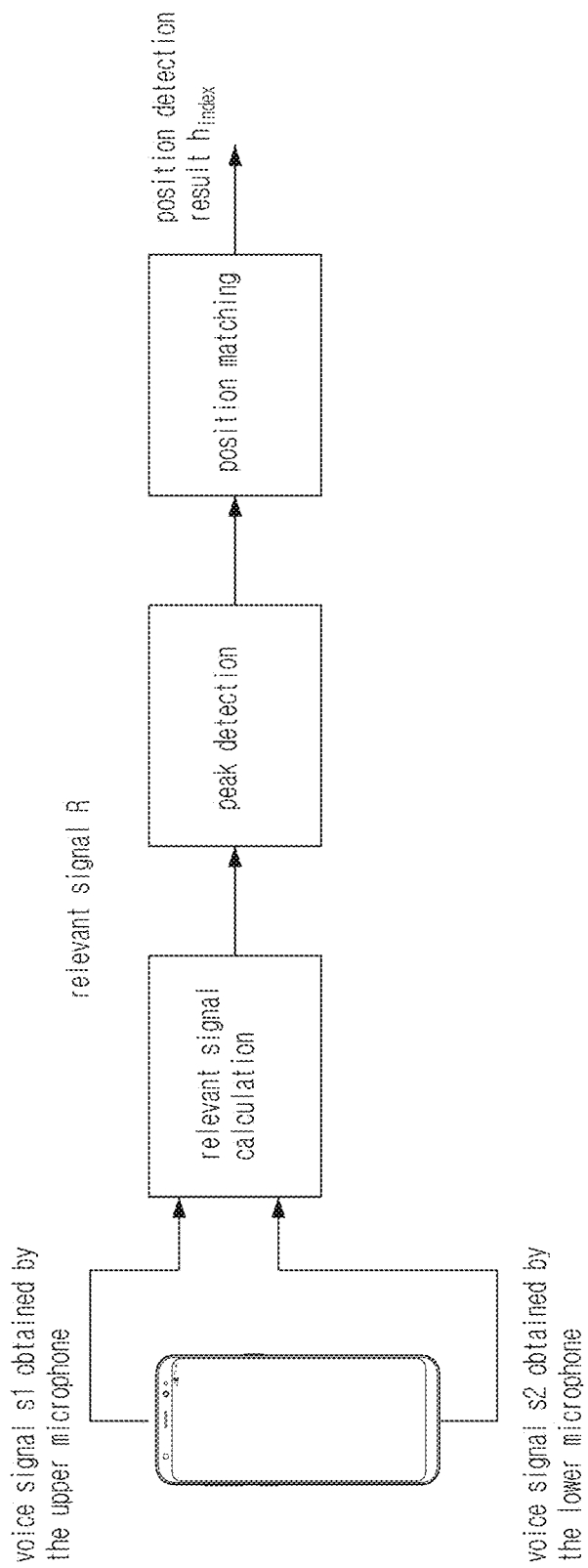
FIG. 21 is a schematic diagram of another position detection method according to an example embodiment of the present disclosure.

As shown in FIG. 21, the solution will be described in detail by taking the above-mentioned situation including two microphones as an example. Firstly, the upper and lower microphones obtain the voice signal s1 and the voice signal s2 respectively, and then the relevant signal $R_{s1s2}(\tau)$ for obtaining the voice signal s1 and the voice signal s2 is calculated. The calculation expression is:

$$R_{s1s2}(\tau) = E[s1(t)*s2(t-\tau)]$$

Where, $\tau = [-T, T]$, T=0.01 s. And a time delay Y=argmax $(R_{S1S2}(\tau))$ is calculated by the peak value of the relevant signal, and finally, the terminal's position relative to the user is matched based on the time delay to complete the position detection.

This position detection method is suitable for a quiet environment. Since it uses the time delay of the user's clean voice to estimate the position, when the noise is large, it will affect the accuracy of the time delay estimation, and then affect the accuracy of the position detection. This method, which is suitable for a quiet environment (that is, an environment with a high SNR), may identify whether the current environment meets the requirements of position detection in the high-performance and high-reliability noise classification module or a signal-to-noise ratio estimation module before the position detection module.

Figure 22:
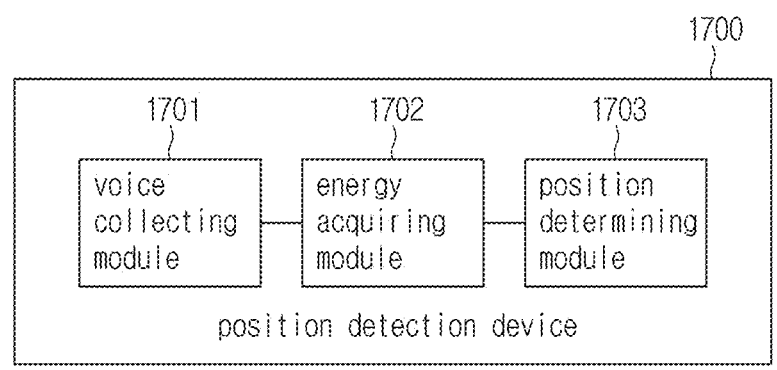
FIG. 22 is a structural block diagram of a position detection apparatus according to an example embodiment of the present disclosure.

FIG. 22 is a structural block diagram of a position detection apparatus according to an example embodiment of the present disclosure. As shown in FIG. 22, the device 1700 may include a voice collecting module 1701, an energy obtaining module 1702, and a position identifying module 1703.

The voice collecting module 1701 is configured to obtain a voice signal during a voice call by at least two voice collecting devices.

The energy obtaining module 1702 is configured to obtain position energy information corresponding to the voice signal.

The position determining module 1703 is configured to identify a position of the terminal device relative to a user during the voice call from predefined positions based on the position energy information.

The terminal device's position detection result is obtained by presetting a plurality of predefined positions, using the feature vectors of the voice signals obtained by a plurality of voice collecting devices during the voice call as the feature vector of the user position, comparing the feature vector of the user position with the feature vectors of each of predefined positions, and identifying the predefined position corresponding to the closest feature vector as the user position. It can provide a reference for enhancing the voice call quality and optimizing the effect of noise suppression.

In an alternative example embodiment of the present disclosure, the energy obtaining module is specifically used to obtain projection energy of the voice signals corresponding to each of the predefined positions.

In an alternative example embodiment of the present disclosure, the energy obtaining module further includes a first projection energy obtainment sub-module, a weight obtainment sub-module, and a second projection energy obtainment sub-module, wherein the first projection energy obtainment sub-module is used to obtain projection energy of each of frequency bins corresponding to each of the predefined positions; the weight obtainment sub-module is used to obtain weight of each of the frequency bins; and the second projection energy obtainment sub-module is used to identify projection energy of the voice signals corresponding to each of the predefined positions, based on the projection energy of each of frequency bins corresponding to each of the predefined positions and the weight of each of the frequency bins.

In an alternative example embodiment of the present disclosure, the first projection energy obtainment sub-module is configured to obtain a feature vector corresponding to the voice signal, wherein the feature vector includes a feature value corresponding to each of the frequency bins; normalize the feature vector to obtain a normalized feature vector corresponding to the voice signal; and identify the projection energy of each of frequency bins corresponding to each of the predefined positions, based on the normalized feature vector and feature matrixes corresponding to each of the predefined positions.

In an alternative example embodiment of the present disclosure, the first projection energy obtainment sub-module is further configured to obtain at least two frequency domain signals corresponding to the voice signal; and combine the feature values of the frequency domain signals at the frequency bin to obtain the feature vector of the voice signal.

In an alternative example embodiment of the present disclosure, the device further includes an amplitude correction module, which is used to, before the normalizing the feature vector, perform frequency response compensation on the feature vector based on a predefined compensation parameter to obtain an amplitude-corrected feature vector.

In an alternative example embodiment of the present disclosure, the device further includes a feature matrix obtainment module, which is configured to identify a distance between a sample sound source and each of voice collecting devices of the terminal device, identify the feature vectors corresponding to the predefined position, based on the distance between the sample sound source and each of the voice collecting devices of the terminal device and identify the feature matrixes corresponding to the predefined positions based on the feature vectors corresponding to the predefined positions.

In an alternative example embodiment of the present disclosure, the weight obtainment sub-module is configured to obtain a predefined weight of each of the frequency bins.

In an alternative example embodiment of the present disclosure, the weight obtainment sub-module is configured to identify the weight of each of the frequency bins through a weight identification neural network, based on the projection energy of each of frequency bins corresponding to each of the predefined positions and/or the position energy information of the voice signals.

In an alternative example embodiment of the present disclosure, the weight identification neural network includes a control subnetwork and a calculation subnetwork. The weight obtainment sub-module is further configured to identify a signal-to-noise ratio characteristic value of the voice signal based on the position energy information of the voice signal by the control subnetwork, identify whether the weight of each of the frequency bins is a predefined weight based on the signal-to-noise ratio characteristic value, and when the weight of each of the frequency bins is not the predefined weight, identify the weight of each of the frequency bins based on the projection energy of each of frequency bins corresponding to each of the predefined positions by the calculation subnetwork.

In an alternative example embodiment of the present disclosure, the control subnetwork performs feature extraction on the position energy information of the voice signals through a plurality of cascaded first feature extraction layers and obtains the signal-to-noise ratio characteristic value based on the extracted features through a classification layer of the control subnetwork; and the calculation subnetwork performs feature extraction on the projection energy of each of frequency bins corresponding to each of the predefined positions through a plurality of cascaded second feature extraction layers and obtains the weight of each of the frequency bins based on the extracted features through a linear regression layer of the calculation subnetwork.

In an alternative example embodiment of the present disclosure, the second feature extraction layer concatenates the extracted features with features output by the corresponding first feature extraction layer in the control subnetwork, and outputs the concatenated features.

In an alternative example embodiment of the present disclosure, the second projection energy obtainment module is configured to weight the projection energy of each of the frequency bins corresponding to each of the predefined positions based on the weight of each of the frequency bins; and summate the weighted projection energy of each of the frequency bins corresponding to each of the predefined positions to obtain the projection energy of the voice signal corresponding to the predefined positions.

In an alternative example embodiment of the present disclosure, the position identification module is configured to select a position corresponding to the maximum position energy information to obtain position of the terminal device relative to the user during the voice call.

In an alternative example embodiment of the present disclosure, the device may include a noise suppression module, which is configured to perform noise suppression on the voice signal to obtain a noise-suppressed voice signal, based on the terminal device's position relative to the user during the voice call.

Figure 23:
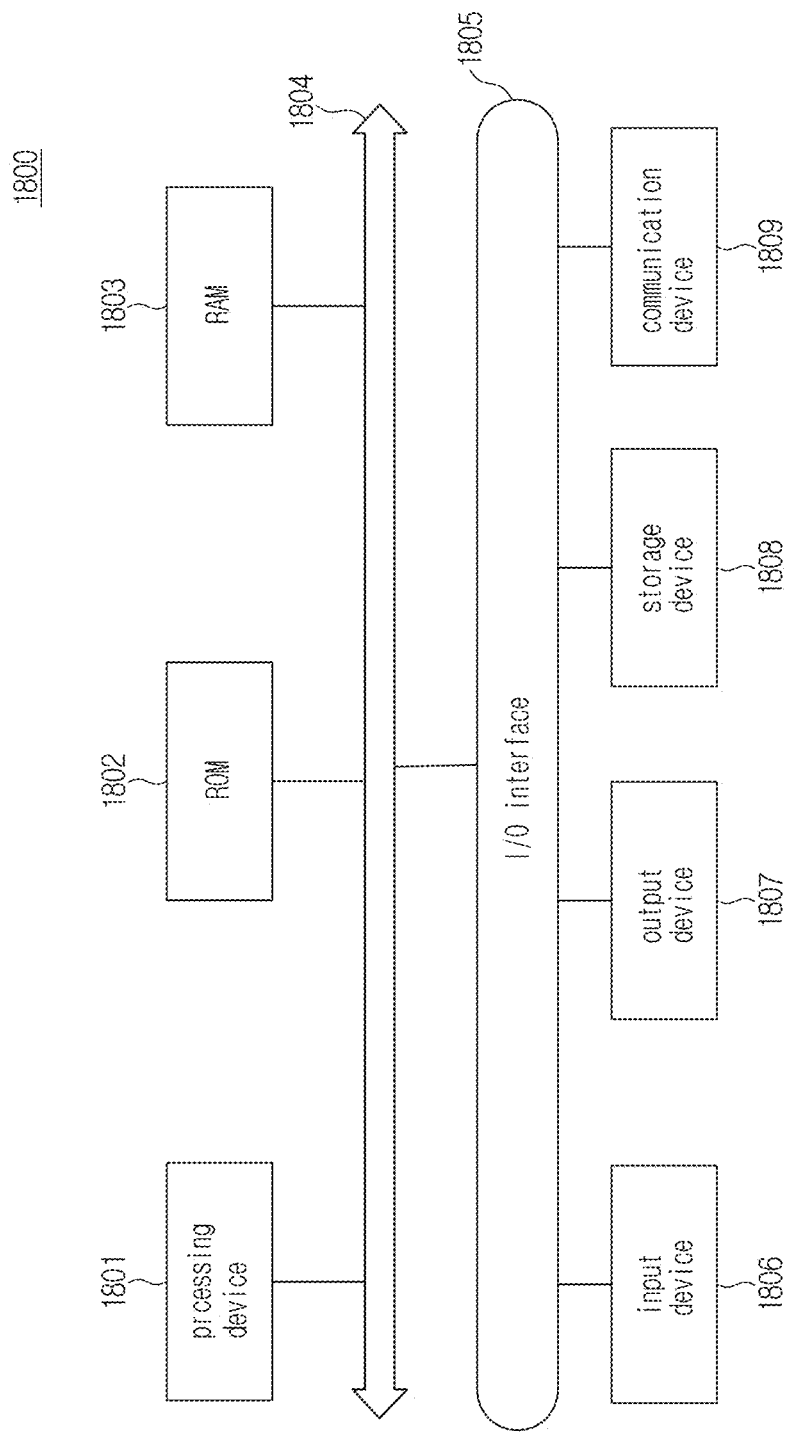
FIG. 23 is a schematic structural diagram of an electronic device according to an example embodiment of the present disclosure.

Referring to FIG. 23, it shows a schematic structural diagram of an electronic device (for example, a terminal device or a server that executes the method shown in FIG. 4) 1800 suitable for implementing the example embodiments of the present disclosure. The electronic devices in the example embodiments of the present disclosure may include, but are not limited to, mobile terminals such as mobile phones, notebook computers, digital broadcast receivers, personal digital assistants (PDAs), tablet computers (PADs), portable multimedia players (PMPs), vehicle-mounted terminals (for example, vehicle navigation terminals), wearable devices, etc., and fixed terminals such as digital TVs, desktop computers, etc. The electronic device shown in FIG. 23 is only an example, and should not bring any limitation to the function and scope of use of the example embodiments of the present disclosure.

The electronic device includes a memory and a processor, where the memory is used to store programs for executing the methods described in the foregoing method example embodiments and the processor is used to execute the programs stored in the memory. The processor here may be referred to as the processing device 1801 described below, and the memory may include at least one of a read-only memory (ROM) 1802, a random access memory (RAM) 1803, and a storage device 1808, specifically as described below.

As shown in FIG. 23, the electronic device 1800 may include a processing device (such as a central processor, a graphics processor, etc.) 1801, which may execute various appropriate actions and processing according to programs stored in a read-only memory (ROM) 1802 or programs loaded into a random access memory (RAM) 1803 from a storage device 1808. In RAM 1803, various programs and data for the operations of the electronic device 1800 are also stored. The processing device 1801, ROM 1802, and RAM 1803 are connected to each other through a bus 1804. An input/output (I/O) interface 1805 is also connected to the bus 1804.

Generally, the following devices may be connected to the I/O interface 1805: an input device 1806 such as a touch screen, touch pad, keyboard, mouse, camera, microphone, accelerometer, gyroscope, etc.; an output device 1807 such as a liquid crystal display (LCD), speakers, vibrator; a storage device 1808 such as a magnetic tape, a hard disk, etc.; and a communication device 1809. The communication device 1809 may allow the electronic device 1800 to perform wireless or wired communication with other devices to exchange data. Although FIG. 23 shows an electronic device having various devices, it should be understood that it is not required to implement or have all the illustrated devices. It may alternatively be implemented or provided with more or fewer devices.

In particular, according to the example embodiments of the present disclosure, the process described above with reference to the flowchart can be implemented as a computer software program. For example, the example embodiments of the present disclosure include a computer program product, which includes computer programs stored on a non-transitory computer readable medium, and the computer programs include program code for executing the method shown in the flowchart. In such an example embodiment, the computer program may be downloaded and installed from the network through the communication device 1809, or installed from the storage device 1808, or installed from the ROM 1802. When the computer program is executed by the processing device 1801, it executes the above-mentioned functions defined in the method of the example embodiment of the present disclosure.

It should be noted that the above-mentioned computer-readable storage medium in the present disclosure may be a computer-readable signal medium or a computer-readable storage medium or any combination thereof. The computer-readable storage medium may be, for example, but not limited to, an electrical, magnetic, optical, electromagnetic, infrared, or semiconductor system, apparatus, or device, or any combination thereof. More specific examples of computer-readable storage media may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination thereof. In the present disclosure, the computer-readable storage medium may be any tangible medium that contains or stores programs, and the programs may be used by or in combination with an instruction execution system, apparatus or device. In the present disclosure, the computer-readable signal medium may include a data signal propagated in a baseband or as a part of a carrier wave, which carries computer-readable program code. This propagated data signal can take many forms, including but not limited to electromagnetic signals, optical signals, or any suitable combination thereof. The computer-readable signal medium may also be any computer-readable medium other than the computer-readable storage medium. The computer-readable signal medium may send, propagate, or transmit the program for being used by or in combination with the instruction execution system, apparatus, or device. The program code contained on the computer-readable medium can be transmitted by any suitable medium, including but not limited to wire, optical cable, radio frequency (RF), etc., or any suitable combination thereof.

In some example embodiments, the client and server can communicate with any currently known or future-developed network protocol, such as HyperText Transfer Protocol (HTTP), and can interconnect with digital data communication (e.g., via a communication network) in any form or medium. Examples of communication networks include local area networks ("LANs"), wide area networks ("WANs"), the Internet, and end-to-end networks (e.g., ad hoc end-to-end networks), as well as any currently known or future researched and developed network.

The above-mentioned computer-readable medium may be included in the above-mentioned electronic device; or it may exist alone without being assembled into the electronic device.

The aforementioned computer-readable medium carries one or more programs, and when the one or more programs are executed by the terminal device, cause the terminal device to: obtain a voice signal during a voice call by at least two voice collecting devices of the terminal device; obtain position energy information of the voice signals; and identify a position of a terminal device relative to a user during the voice call from predefined positions based on the position energy information.

The computer program code used to perform the operations of the present disclosure can be written in one or more programming languages or a combination thereof. The above-mentioned programming languages include but are not limited to object-oriented programming languages—such as Java, Smalltalk, C++, and also include conventional procedural programming languages-such as "C" language or similar programming languages. The program code can be executed entirely on the user's computer, partially on the user's computer, executed as an independent software package, partially on the user's computer and partially on a remote computer, or entirely on the remote computer or server. In the case of a remote computer, the remote computer can be connected to the user's computer through any kind of network, including a LAN or WAN, or it can be connected to an external computer (e.g., through an Internet connection by using an Internet service provider).

The flowcharts and block diagrams in the accompanying drawings illustrate the possible implementation of the system architecture, functions, and operations of the system, method, and computer program product according to various example embodiments of the present disclosure. In this regard, each block in the flowchart or block diagram can represent a module, program segment, or part of code, and the module, program segment, or part of code contains one or more executable instructions for realizing the specified logical function. It should also be noted that, in some alternative implementations, the functions marked in the block may also occur in a different order from the order shown in the drawings. For example, two blocks shown in succession can actually be executed substantially in parallel, or they can be executed in the reverse order, or a different order, depending on the functions involved. It should also be noted that each block in the block diagram and/or flowchart, and the combination of the blocks in the block diagram and/or flowchart, can be implemented by a dedicated hardware-based system that performs the specified functions or operations, or can be implemented by a combination of dedicated hardware and computer instructions.

The modules or units involved in the example embodiments described in the present disclosure can be implemented in software or hardware. The name of the module or unit does not constitute a limitation on the unit itself under certain circumstances. For example, the voice collection module can also be described as a "module for collecting voice".

The functions described hereinabove may be performed at least in part by one or more hardware logic components. For example, without limitation, available hardware logic components of exemplary types may include: Field Programmable Gate Array (FPGA), Application Specific Integrated Circuit (ASIC), Application Specific Standard Product (ASSP), System on Chip (SOC), Complex Programmable Logical device (CPLD), and the like.

In the context of the present disclosure, a machine-readable medium may be a tangible medium, which may contain or store a program for use by or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of machine-readable storage media would include electrical connections based on one or more wires, portable computer disks, hard drives, random access memory (RAM), read-only memory (ROM), erasable programmable read-only memory (EPROM or flash memory), optical fiber, portable compact disk read only memory (CD-ROM), optical storage device, magnetic storage device, or any suitable combination thereof.

The device provided in the example embodiment of the present disclosure can implement at least one of a plurality of modules through an artificial intelligence (AI) model. The functions associated with AI may be performed by non-volatile memory, volatile memory, and a processor.

The processor may include one or more processors. The one or more processors may be general-purpose processors (e.g., a central processing unit (CPU), an application processor (AP)), or a pure graphics processing unit (e.g., graphics processing unit (GPU), visual processing Unit (VPU), or the like), and/or an AI dedicated processor (e.g., neural processing unit (NPU)).

The one or more processors control the processing of input data according to predefined operating rules or AI models stored in non-volatile memory and volatile memory. Pre-defined operating rules or artificial intelligence models are provided through training or learning.

Here, providing by learning refers to obtaining predefined operating rules or AI models with desired characteristics by applying learning algorithms to a plurality of learning data. This learning may be performed in the device itself in which the AI according to the example embodiment is executed, and/or may be implemented by a separate server/system.

The AI model may contain a plurality of neural network layers. Each layer has a plurality of weight values, and the calculation of one layer is performed by the calculation result of the previous layer and a plurality of weights of the current layer. Examples of neural networks include, but are not limited to, Convolutional Neural Networks (CNNs), Deep Neural Networks (DNNs), Recurrent Neural Networks (RNNs), Restricted Boltzmann Machines (RBMs), Deep Belief Networks (DBNs), Bidirectional Loops Deep Neural Networks (BRDNNs), Generative Adversarial Networks (GANs), and Deep Q Networks.

A learning algorithm is a method of training a predefined target device (e.g., a robot) using a plurality of learning data to make, allow, or control the target device to make a determination or prediction. Examples of the learning algorithm include, but are not limited to, supervised learning, unsupervised learning, semi-supervised learning, or reinforcement learning.

Those skilled in the art can clearly understand that for the convenience and conciseness of the description, the specific method implemented when the computer-readable medium described above is executed by the electronic device can refer to the corresponding process in the foregoing method example embodiment, which will not be repeated here.

What is claimed is:

1. A position detection method performed by a terminal device comprising:
    setting a plurality of predefined positions respectively corresponding to a plurality of angles between a central axis of the terminal device and a central axis of a face of a user;
    obtaining voice signals during a voice call by at least two voice collecting devices of the terminal device;
    obtaining position energy information of the voice signals;
    obtaining a plurality of feature vectors respectively corresponding to the plurality of predefined positions based on the position energy information; and
    identifying one of the plurality of predefined positions as a position of the terminal device relative to the user during the voice call, based on a feature vector corresponding to the user and the plurality of feature vectors.

2. The position detection method of claim 1, wherein the obtaining the position energy information of the voice signals comprises:
    obtaining projection energies of the voice signals corresponding to each of the plurality of predefined positions.

3. The position detection method of claim 2, wherein the obtaining the projection energies of the voice signals corresponding to each of the plurality of predefined positions comprises:
    obtaining a projection energy of each of a plurality of frequency bins corresponding to each of the plurality of predefined positions, wherein the plurality of frequency bins are included in the voice signals;
    obtaining weight of each of the plurality of frequency bins; and
    identifying the projection energies of the voice signals corresponding to each of the plurality of predefined positions, based on the projection energy of each of the plurality of frequency bins corresponding to each of the plurality of predefined positions and the weight of each of the plurality of frequency bins.

4. The position detection method of claim 3, wherein the obtaining the projection energy of each of the plurality of frequency bins corresponding to each of the plurality of predefined positions comprises:
    normalizing the plurality of feature vectors to obtain normalized feature vectors corresponding to the voice signals; and
    identifying the projection energy of each of the plurality of frequency bins corresponding to each of the plurality of predefined positions, based on the normalized feature vectors and feature matrixes corresponding to each of the plurality of predefined positions.

5. The position detection method of claim 4, wherein the obtaining the plurality of feature vectors corresponding to the voice signals comprises:
obtaining at least two frequency domain signals corresponding to the voice signals; and
combining feature values of the at least two frequency domain signals of the plurality of frequency bins to obtain the plurality of feature vectors of the voice signals.

6. The position detection method of claim 4, further comprising:
before normalizing the plurality of feature vectors, performing frequency response compensation on the plurality of feature vectors based on a predefined compensation parameter to obtain amplitude-corrected feature vectors.

7. The position detection method of claim 4, further comprising:
for a predefined position, among the plurality of predefined positions, identifying distances between a sample sound source and each of the voice collecting devices of the terminal device;
identifying the plurality of feature vectors corresponding to the plurality of predefined positions, based on the distances between the sample sound source and each of the voice collecting devices of the terminal device; and
identifying the feature matrixes corresponding to the plurality of predefined positions based on the plurality of feature vectors corresponding to the plurality of predefined positions.

8. The position detection method of claim 3, wherein the obtaining weight of each of the plurality of frequency bins comprises:
obtaining a predefined weight of each of the plurality of frequency bins.

9. The position detection method of claim 3, wherein the obtaining weight of each of the plurality of frequency bins comprises:
identifying the weight of each of the plurality of frequency bins through a weight identification neural network, based on the projection energy of each of the plurality of frequency bins corresponding to each of the plurality of predefined positions or the position energy information of the voice signals.

10. The position detection method of claim 9, further comprising:
identifying, by a control subnetwork, signal-to-noise ratio characteristic values of the voice signals based on the position energy information of the voice signals;
identifying whether the weight of each of the plurality of frequency bins is a predefined weight based on the signal-to-noise ratio characteristic value; and
based on the weight of each of the plurality of frequency bins not being the predefined weight, identifying, by a calculation subnetwork, the weight of each of the plurality of frequency bins based on the projection energy of each of the plurality of frequency bins corresponding to each of the plurality of predefined positions.

11. The position detection method of claim 10, wherein:
the control subnetwork is configured to extract features on the position energy information of the voice signals through a plurality of cascaded first feature extraction layers and obtain the signal-to-noise ratio characteristic value based on the extracted features through a classification layer of the control subnetwork; and
the calculation subnetwork is configured to extract features on the projection energy of each of the plurality of frequency bins corresponding to each of the plurality of predefined positions through a plurality of cascaded second feature extraction layers and obtain the weight of each of the plurality of frequency bins based on the extracted features through a linear regression layer of the calculation subnetwork.

12. The position detection method of claim 11, wherein the plurality of cascaded second feature extraction layers is configured to concatenate the extracted features with features output by the corresponding first feature extraction layer in the control subnetwork, and output the concatenated features.

13. The position detection method of claim 3, wherein the identifying projection energies of the voice signals corresponding to each of the plurality of predefined positions, based on the projection energy of each of the plurality of frequency bins corresponding to each of the plurality of predefined positions and the weight of each of the plurality of frequency bins, comprises:
weighting the projection energy of each of the plurality of frequency bins corresponding to each of the plurality of predefined positions based on the weight of each of the plurality of frequency bins; and
summating the weighted projection energy of each of the plurality of frequency bins corresponding to each of the plurality of predefined positions to obtain the projection energies of the voice signals corresponding to the plurality of predefined positions.

14. The position detection method of claim 1, wherein the identifying the position of the terminal device relative to the user during the voice call from the plurality of predefined positions based on the position energy information comprises:
obtaining projection energies of the voice signals corresponding to each of the plurality of predefined positions;
identifying a maximum position energy information, from among the projection energies of the voice signals corresponding to each of the plurality of predefined positions; and
obtaining the position of the terminal device, from among the plurality of predefined positions, based on the maximum position energy information.

15. The position detection method of claim 1, further comprising:
performing noise suppression on the voice signals to obtain a noise-suppressed voice signals, based on the position of the terminal device relative to the user during the voice call.

16. A terminal device comprising:
one or more processors;
a memory configured to store one or more application programs that, when executed by the one or more processors, cause the one or more processors to:
set a plurality of predefined positions respectively corresponding to a plurality of angles between a central axis of the terminal device and a central axis of a face of a user;
obtain voice signals during a voice call from at least two voice collecting devices of the terminal device;
obtain position energy information of the voice signals;

obtain a plurality of feature vectors respectively corresponding to the plurality of predefined positions based on the position energy information; and identify one of the plurality of predefined positions as a position of the terminal device relative to the user during the voice call, based on a feature vector corresponding to the user and the plurality of feature vectors.

17. A non-transitory computer-readable medium storing instructions, the instructions comprising:

one or more instructions that, when executed by a processor of a terminal device, cause the processor to:

set a plurality of predefined positions respectively corresponding to a plurality of angles between a central axis of the terminal device and a central axis of a face of a user;

obtain voice signals during a voice call from at least two voice collecting devices of the terminal device;

obtain position energy information of the voice signals;

obtain a plurality of feature vectors respectively corresponding to the plurality of predefined positions based on the position energy information; and identify one of the plurality of predefined positions as a position of the terminal device relative to the user during the voice call, based on a feature vector corresponding to the user and the plurality of feature vectors.

* * * * *